United States Patent
Kang et al.

(10) Patent No.: US 10,929,851 B2
(45) Date of Patent: Feb. 23, 2021

(54) PORTABLE APPARATUS AND METHOD FOR CHANGING SCREEN OF THE SAME

(71) Applicant: Samsung Electronics Co., Ltd., Suwon-si (KR)

(72) Inventors: Minkoo Kang, Seoul (KR); Kyunghee Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 352 days.

(21) Appl. No.: 15/188,425

(22) Filed: Jun. 21, 2016

(65) Prior Publication Data

US 2016/0371691 A1 Dec. 22, 2016

(30) Foreign Application Priority Data

Jun. 22, 2015 (KR) ........................ 10-2015-0088561

(51) Int. Cl.
*G06Q 20/40* (2012.01)
*G06F 21/32* (2013.01)
(Continued)

(52) U.S. Cl.
CPC ......... *G06Q 20/405* (2013.01); *G06F 3/0484* (2013.01); *G06F 3/0488* (2013.01); *G06F 3/04842* (2013.01); *G06F 3/04883* (2013.01); *G06F 21/32* (2013.01); *G06K 9/00013* (2013.01); *G06K 9/00355* (2013.01); *G06Q 20/32* (2013.01); *G06Q 20/352* (2013.01);
(Continued)

(58) Field of Classification Search
USPC ......................................................... 705/44
See application file for complete search history.

(56) References Cited

U.S. PATENT DOCUMENTS

| 8,628,012 | B1 | 1/2014 | Wallner |
| 2011/0247067 | A1 | 10/2011 | Hirose |

(Continued)

FOREIGN PATENT DOCUMENTS

| CN | 101814169 A | 8/2010 |
| CN | 103136663 A | 6/2013 |

(Continued)

OTHER PUBLICATIONS

European Office Action dated Jul. 24, 2018.

(Continued)

*Primary Examiner* — Hani M Kazimi
*Assistant Examiner* — Hatem M Ali
(74) *Attorney, Agent, or Firm* — Jefferson IP Law, LLP

(57) ABSTRACT

A portable apparatus and a screen change method of the portable apparatus are provided. More particularly, provided are a portable apparatus and a screen change method of the portable apparatus which display a mobile payment screen corresponding to a continuous movement of a touch connecting a button and a touch screen, which are positioned on a front side of the portable apparatus. According to some embodiments of the present disclosure, provided are a portable apparatus and a screen change method of the portable apparatus that change a first screen, which is displayed corresponding to a first input detected through a button and a continuous movement of a first touch detected on a touch screen, to a mobile payment screen.

14 Claims, 19 Drawing Sheets

(51) Int. Cl.
    *G06F 3/0484*     (2013.01)
    *G06F 3/0488*     (2013.01)
    *G06Q 20/32*     (2012.01)
    *G06K 9/00*     (2006.01)
    *G06Q 20/34*     (2012.01)
    *G06F 3/01*     (2006.01)

(52) U.S. Cl.
    CPC ....... *G06Q 20/40145* (2013.01); *G06F 3/016* (2013.01); *G06K 9/00006* (2013.01); *H04M 2250/02* (2013.01); *H04M 2250/04* (2013.01); *H04M 2250/22* (2013.01)

(56) References Cited

U.S. PATENT DOCUMENTS

| | | | | |
|---|---|---|---|---|
| 2011/0282785 | A1* | 11/2011 | Chin | G06F 3/04883 705/42 |
| 2011/0300829 | A1 | 12/2011 | Nurmi et al. | |
| 2014/0253526 | A1* | 9/2014 | Park | H04W 12/08 345/204 |
| 2015/0047017 | A1 | 2/2015 | Kim et al. | |
| 2015/0116086 | A1* | 4/2015 | Kim | G06F 21/32 340/5.83 |
| 2015/0227922 | A1* | 8/2015 | Filler | G06Q 20/382 705/41 |

FOREIGN PATENT DOCUMENTS

| | | |
|---|---|---|
| KR | 10-2015-0018349 A | 2/2015 |
| KR | 10-2015-0029127 A | 3/2015 |
| WO | 2013/173838 A2 | 11/2013 |
| WO | 2015/016524 A1 | 2/2015 |

OTHER PUBLICATIONS

Chinese Office Action dated Jun. 28, 2020, issued in Chinese Application No. 201680036966.8.

Indian Office Action dated Dec. 20, 2019, issued in Indian Application No. 201717042663.

European Summons to Attend Oral Proceedings dated Apr. 15, 2018, issued in European Application No. 16175478.3.

\* cited by examiner

PORTABLE APPARATUS AND METHOD FOR CHANGING SCREEN OF THE SAME

CROSS-REFERENCE TO RELATED APPLICATION(S)

This application claims the benefit under 35 U.S.C. § 119(a) of a Korean patent application filed on Jun. 22, 2015 in the Korean Intellectual Property Office and assigned Serial No. 10-2015-0088561, the entire disclosure of which is hereby incorporated by reference.

TECHNICAL FIELD

The present disclosure relates to a portable apparatus and a screen change method of the portable apparatus. More particularly, the present disclosure relates to a portable apparatus that changes a screen that is displayed corresponding to a continuous movement of a touch detected between a home button and a touch screen, and a screen change method of the portable apparatus.

BACKGROUND

Recently, portable apparatuses provide not only call and data transmission services but also various services and functions including mobile payment.

When a user purchases a product at a shop, the user may pay for the product using a mobile card registered in a portable apparatus, instead of using a real card (for example, a credit card).

For mobile payment, the user runs a mobile payment application first and selects a mobile card on the running application in order to pay. The user may need to perform the foregoing complicated procedure to achieve mobile payment.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a portable apparatus and a screen change method of the portable apparatus. A mobile payment screen may be displayed corresponding to a continuous movement of a touch, which starts from a button having a fingerprint sensor to receive a user fingerprint, reaching a touch screen. According to an embodiment of the present disclosure, a mobile payment screen may be displayed corresponding to a continuous movement of a touch, which starts from a button having a fingerprint sensor to receive a user fingerprint, passing through a swipe area of a touch screen.

According to an embodiment of the present disclosure, a mobile payment screen may be displayed corresponding to a continuous movement of a touch, which starts from a touch screen, being detected from a button having a fingerprint sensor to receive a user fingerprint. According to an embodiment of the present disclosure, a mobile payment screen may be displayed corresponding to a continuous movement of a touch, which starts from the outside of a swipe area of a touch screen, being detected from a button having a fingerprint sensor to receive a user fingerprint.

In accordance with an aspect of the present disclosure, a portable apparatus is provided. The portable apparatus includes a button configured to receive a first input, a touch screen, positioned above the button, configured to display a first screen, and a controller configured to control the button and the touch screen, and to control to change the first screen to a mobile payment screen corresponding to a continuous movement of a first touch, which is connected from the received first input and is detected on the touch screen.

According to an aspect of the present disclosure, the button may include a fingerprint sensor, and the controller may control to authenticate a user using a user fingerprint received through the fingerprint sensor.

According to an aspect of the present disclosure, the controller may control to gradually display a mobile payment card from one side of the touch screen corresponding to authentication using the fingerprint and the continuous movement of the first touch.

In accordance with another aspect of the present disclosure, a portable apparatus is provided. The portable apparatus includes a touch screen configured to display a first screen, a button, positioned below the touch screen, configured to receive a first touch, and a controller configured to control the button and the touch screen, and control to change the first screen to a mobile payment screen corresponding to a continuous movement of a first input detected on the touch screen and the first touch.

According to an aspect of the present disclosure, a fingerprint sensor may be installed in the button, and the controller may control to authenticate a user using a user fingerprint received through the fingerprint sensor.

According to an aspect of the present disclosure, the controller may control to gradually display a mobile payment card from one side of the touch screen corresponding to the continuous movement of the first input and authentication using the fingerprint.

In accordance with another aspect of the present disclosure, a screen change method of a portable apparatus is provided. The screen change method includes detecting a first input through a button, authenticating a user fingerprint using the first input, detecting a continuous movement of a first touch in an upward direction on a touch screen that displays a first screen, and changing the first screen to a mobile payment screen corresponding to the authentication of the fingerprint and the continuous movement of the first touch, wherein the button comprises a fingerprint sensor and the user fingerprint is received using the fingerprint sensor.

According to an aspect of the present disclosure, the screen change method may include gradually displaying a mobile payment card from one side of the touch screen corresponding to the authentication of the fingerprint and the continuous movement of the first touch.

In accordance with another aspect of the present disclosure, a screen change method of a portable apparatus is provided. The screen change method includes detecting a first input from a touch screen which displays a first screen, detecting a continuous movement of the first input, gradually displaying at least one mobile card from one side of the touch screen on the first screen corresponding to the continuous movement of the first input, and changing the first screen to a mobile payment screen including the at least one mobile card corresponding to the first input being touch-released.

According to an aspect of the present disclosure, the screen change method may further include detecting a first touch from a button having a fingerprint sensor, and authenticating a fingerprint based on the first touch.

According to an aspect of the present disclosure, the screen change method may include gradually displaying a payment mobile card from one side of the touch screen corresponding to the continuous movement of the first input and authentication of the fingerprint.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
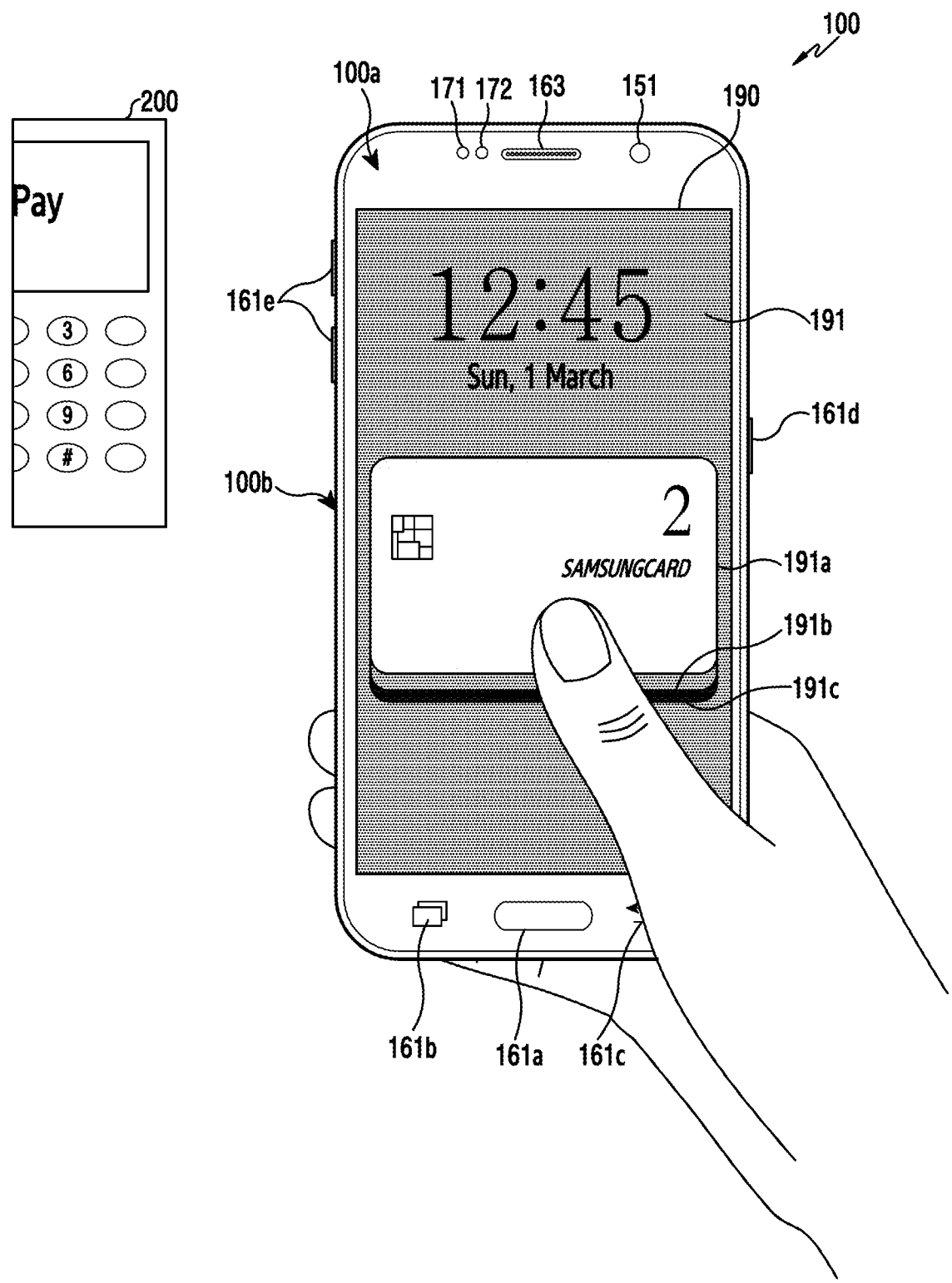
FIG. 1 is a schematic frontal perspective view illustrating a portable apparatus according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Ordinal terms such as "first" and "second" may be used to describe various elements, but these elements are not limited by the terms. The above terms may be used to distinguish one element from another element. For example, a first element may be named a second element in the scope of protection of the present disclosure. Further, a second element may also be named a first element. As used herein, the term "and/or" includes any and all combinations of one or more disclosed items.

Applications, according to various embodiments of the present disclosure, refer to software running on a computer operating system (OS) or mobile OS to be used by a user. For example, the applications may include a web browser, a mobile payment application, a photo album application, a word processor, a spread sheet, a contacts application, a calendar application, a memo application, an alarm application, a social network system (SNS) application, a game store, a chatting application, a map application, a music player, a video player, or the like.

Applications, according to various embodiments of the present disclosure, refer to software running on a portable apparatus or an external apparatus (for example, a server or the like) connected with the portable apparatus wirelessly or via a cable. Also, applications, according to various embodiments of the present disclosure, refer to software running on a portable apparatus corresponding to a received user input.

Content may be displayed on a running application. For example, the content may include a video file or an audio file played from a video player as one application, a music file played from a music player, a photo file displayed from a photo album application, a web page file displayed from a web browser, payment information (for example, a mobile card number) transmitted from a mobile payment application, or the like. Further, the payment information may include encrypted one-time token information.

Content may include a video file, an audio file, a text file, an image file, or a web page displayed or running on an application.

In various embodiments of the present disclosure, the term "video" may be used the same as "moving image". Further, content may include a video file, an audio file, a text file, an image file, or a web page running corresponding to a received user input (for example, a touch or the like).

Content may include a screen of a running application and a user interface forming the screen of the application. Further, content may include one piece of content or a plurality of pieces of content.

A widget refers to a mini-application as one type of graphic user interface (GUI) for supporting smooth interactions between a user and an application or OS. For example, the widget may include a weather widget, a calculator widget, a clock widget, or the like.

In the description, it should be understood that the terms "include" or "have" indicate existence of a feature, a number, a step, an operation, a structural element, parts, or a combination thereof, and do not previously exclude the existences or probability of addition of one or more another features, numeral, steps, operations, structural elements, parts, or combinations thereof. The same reference numerals represented in each of the drawings indicate the elements that perform substantially the same functions.

FIG. 1 is a schematic frontal perspective view illustrating a portable apparatus according to an embodiment of the present disclosure.

Referring to FIG. 1, a touch screen 190 is positioned in a central area of a front side 100a of the portable apparatus 100. The touch screen 190 may include a flexible display panel (not shown). Further, the touch screen 190 may include a flexible touch panel (not shown) corresponding to the flexible display panel (not shown).

The touch screen 190 may be bent or curved through a thin and flexible printed circuit board (not shown). The touch screen 190 may include a main touch screen 190 and a single-edge touch screen (not shown) or dual-edge touch screen (not shown) extending from the main touch screen 190. In the touch screen 190, the main touch screen 190 and the single-edge touch screen (not shown) or dual-edge touch screen (not shown) may be formed in a single body.

FIG. 1 illustrates an example of a mobile payment screen 191 of a running mobile payment application displayed on the touch screen 190. The mobile payment screen 191 displays a mobile card 191a used for payment. One mobile card 191a or a plurality of mobile cards 191a to 191c may be displayed. A user may pay by bringing the mobile card 191a displayed on the portable apparatus 100 into either contact or non-contact with a point of sale (POS) device 200.

The POS device 200 may recognize a magnetic card with a magnetic stripe or an integrated chip (IC) card with an embedded microchip. The POS device 200 may recognize a magnetic mobile card with no magnetic stripe. Further, the POS device 200 may recognize a mobile card using short-range communications (for example, Bluetooth, Bluetooth low energy (BLE), infrared data association (IrDA,), ultra wideband (UWB), magnetic secure transmission (MST), and/or near field communication (NFC)).

The touch screen 190 of the portable apparatus 100 may display one or more home screens (not shown). The home screens (not shown) may display a shortcut icon (not shown) corresponding to an application to be selected via a touch (for example, including hovering), a weather widget (not shown), a clock widget (not shown), and the like.

A status bar (not shown), which displays a status of the portable apparatus 100, such as a battery charging status, received signal strength, and current time, may be displayed above the home screens (not shown). Further, the home screens (not shown) of the portable apparatus 100 may be positioned below the status bar (not shown) or may be displayed alone without the status bar (not shown) being displayed.

A first camera 151, one or a plurality of speakers 163, a proximity sensor 171, and an illuminance sensor 172 (see FIG. 2) may be positioned on an upper portion of the front side 100a of the portable apparatus 100. A second camera 152 and a flash 153 (see FIG. 2) may be positioned on a rear side (not shown) of the portable apparatus 100.

A home button 161a, a recent app button 161b, and a back button 161c are positioned on a lower portion of the front side 100a of the portable apparatus 100. Buttons (e.g., 161a-161e, referred to generally as '161') may be provided not only as a physical button (for example, the home button 161a, a power/lock button 161d, volume buttons 161e, or the like) but also as a touch button (for example, the home button 161a, the recent app button 161b, and the back button 161c). Further, the buttons 161 may be displayed along with a text or an icon on the touch screen 190.

The power/lock button 161d and the volume buttons 161e may be positioned on a lateral side 100b of the portable apparatus 100. The lateral side 100b of the portable apparatus 100 may connect the front side 100a and the rear side (not shown) of the portable apparatus 100. The lateral side 100b of the portable apparatus 100 may include a left lateral side, a right lateral side, a top side, and a bottom side.

One or a plurality of microphones 162 (see FIG. 2) may be positioned on the top side, the lateral side 100b, and/or the bottom side of the portable apparatus 100. A connector 165 (see FIG. 2) and/or the speaker 163 may be positioned on the top side, the lateral side 100b, and/or the bottom side of the portable apparatus 100. An insertion hole (not shown) into which an input pen 167 (see FIG. 2) with a button (not shown) is inserted may be positioned on the top side or bottom side of the portable apparatus 100. The input pen 167 (see FIG. 2) may be kept in the portable apparatus 100 through the insertion hole (not shown) and be drawn out of the portable apparatus 100 for use.

Figure 2:
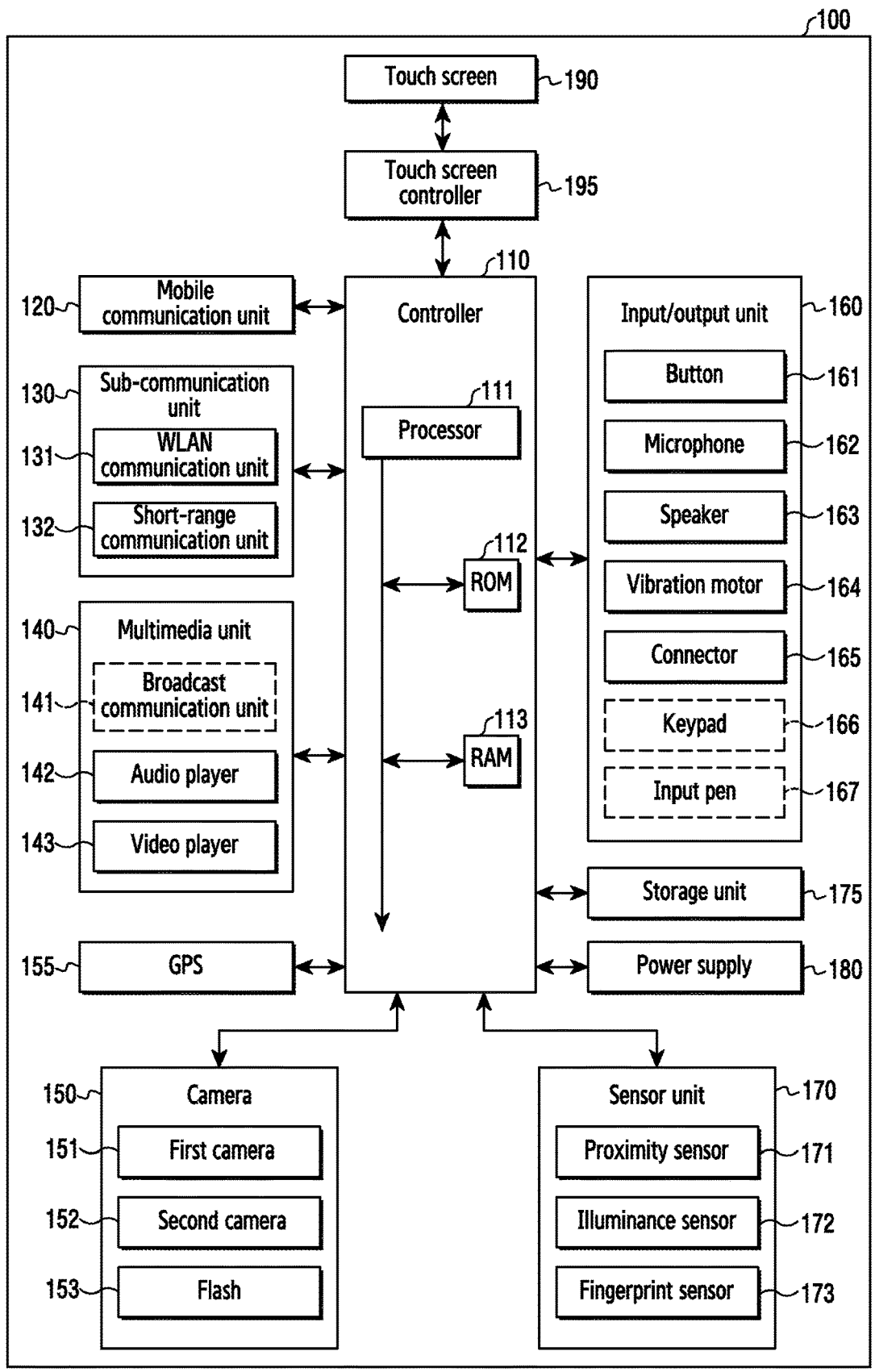
FIG. 2 is a schematic block diagram illustrating a portable apparatus according to an embodiment of the present disclosure.

FIG. 2 is a schematic block diagram illustrating a portable apparatus according to an embodiment of the present disclosure.

Referring to FIG. 2, the portable apparatus 100 may be connected to a different apparatus (for example, a wearable apparatus or a server) via a cable or wirelessly using a mobile communication unit 120, a sub-communication unit 130, and a connector 165. For example, the portable apparatus 100 may include a mobile phone (not shown), a smartphone (not shown), a tablet device (not shown), an Moving Picture Experts Group (MPEG-1 or MPEG-2) audio layer 3 (MP3) player (not shown), a video player (not shown), an electronic whiteboard (not shown), a monitor (not shown), an electronic device with a display (for example, a refrigerator, a washing machine, an air conditioner, or the like), a display apparatus (not shown), or the like.

The display apparatus may be provided as an analog television (TV), a digital TV, a three-dimensional (3D) TV, a smart TV, an light emitting diode (LED) TV, an organic LED (OLED) TV, a plasma TV, a curved TV with a fixed-curvature screen, a flexible TV with a fixed-curvature screen, a bended TV with a fixed-curvature screen, and/or a curvature-variable TV with a screen curvature changing based on a received user input. However, it would be readily understood by a person skilled in the art that the display apparatus is not limited thereto.

The portable apparatus 100 may transmit data (content, payment information, or the like) to the outside or receive data from the outside through the communication unit 120 or 130 using the touch screen 190. The portable apparatus 100 may transmit data (content, payment information, or the like) to the outside or receive data from the outside through the communication unit 120 or 130 using the input pen 167 and the touch screen 190. The portable apparatus 100 may transmit data (content, payment information, or the like) to the outside or receive data from the outside corresponding to an interaction (for example, a touch or touch gesture) input through the touch screen 190. Further, the portable apparatus 100 may transmit data (content, payment information, or the like) to the outside or receive data from the outside through the communication unit 120 or 130 using a display (for example, an example having only a display panel without a touch panel, not shown).

The portable apparatus 100 includes a controller 110, the mobile communication unit 120, the sub-communication unit 130, a multimedia unit 140, a camera 150, a global positioning system (GPS) 155, an input/output unit 160, a sensor unit 170, a storage unit 175, and a power supply 180. Further, the portable apparatus 100 includes the touch screen 190 and a touch screen controller 195.

The controller 110 may include a processor 111, a read-only memory (ROM) 112 that stores a control program to control the portable apparatus 100, and a random-access memory (RAM) 113 that stores signals or data input from the outside of the portable apparatus 100 or is used as a storage area for various operations performed via the portable apparatus 100.

The controller 110 functions to control overall operations of the portable apparatus 100 and signal flow between internal components 120 to 195 of the portable apparatus 100, and functions to process data. The controller 110 controls the supply of power to the internal components 120 to 195 using the power supply 180. In addition, when a user input is received or satisfies a set condition, the controller 110 may operate a sensor of the sensor unit 170, or may run an OS or an application stored in the storage unit 175.

The processor 111 may include a graphic processing unit (GPU, not shown) for graphic processing. The processor 111 may be provided in the form of a system on chip (SOC) including a core (not shown) and a GPU (not shown). The processor 111 may include a single core, a dual core, a triple core, a quad core, and a core of a multiple thereof. Further, the processor 111, the ROM 112, and the RAM 113 may be connected to each other via a bus.

The controller 110 may control the mobile communication unit 120, the sub-communication unit 130, the multimedia unit 140, the camera 150, the GPS 155, the input/output unit 160, the sensor unit 170, the storage unit 175, the power supply 180, the touch screen 190, and the touch screen controller 195.

The controller 110, according to an embodiment of the present disclosure, controls a button (for example, the home button 161a) to receive a first input and the touch screen 190, which is positioned above the button and displays a first screen, and controls to change the first screen to a mobile payment screen corresponding to a continuous movement of a first touch, which is connected from the received first input and is detected on the touch screen 190.

A fingerprint sensor 173 is installed in the button, and the controller 110 may authenticate a user with a user fingerprint received through the fingerprint sensor 173.

The controller 110 may control to detect the first input and the first touch as a single touch gesture.

The controller 110 may detect the first input and the first touch as the single touch gesture using one of a time interval between the first input and the first touch and an area between the first input and the first touch.

The controller 110 may control to gradually display a payment mobile card from one side of the touch screen 190 corresponding to the authentication with the fingerprint and the continuous movement of the first touch.

The touch screen 190 includes a bezel touch area for receiving the first touch and a swipe area for receiving the continuous movement of the first touch. When the continuous movement of the first touch passes through the swipe area, the controller 110 may control to display the mobile payment card on the touch screen 190.

When the touch is released at a final position of the continuous movement of the first touch, the controller 110 may control to display the mobile payment screen.

The controller 110 may control to provide a feedback corresponding to the continuous movement of the first touch, and the feedback may include at least one of a visual feedback, an audio feedback, and a haptic feedback.

The controller 110 may detect the continuous movement of the first touch as one of a straight line and a curve.

The controller 110, according to another embodiment of the present disclosure, controls the touch screen 190 to display a first screen and a button (for example, the home button 161a) that is positioned below the touch screen 190 and receives a first touch, and controls to change the first screen to a mobile payment screen corresponding to a continuous movement of a first input detected on the touch screen 190 and the first touch.

The fingerprint sensor 173 is installed in the button, and the controller 110 may authenticate a user with a user fingerprint received through the fingerprint sensor 173.

The controller 110 may control to gradually display a mobile payment card from one side of the touch screen 190 corresponding to the continuous movement of the first input and the authentication with the fingerprint.

The touch screen 190 includes a swipe area for receiving the continuous movement of the first input and a bezel touch area for receiving a final position of the continuous movement of the first input. When the continuous movement of the first input passes through the swipe area and the bezel touch area so that the button receives the first touch, the controller 110 may control to display the payment mobile card on the touch screen 190.

In various embodiments of the present disclosure, the term "controller" includes the processor 111, the ROM 112, and the RAM 113.

The mobile communication unit 120 may connect to a different apparatus (for example, another portable apparatus, a wearable apparatus, or a server) through a mobile communication network using one or more antennas according to control by the controller 110. The mobile communication unit 120 may receive data (or content) from the different apparatus according to control by the controller 110. The received data (or content) may be stored in the storage unit 175 according to control by the controller 110.

The mobile communication unit 120 may transmit/receive a radio signal for a voice call, a video call, a text message, short message service (SMS), a multimedia message (MMS), and data communications to/from a mobile phone with a phone number for connection (not shown), a smartphone (not shown), a tablet personal computer (PC), or other portable apparatuses (not shown).

The sub-communication unit 130 may connect to a different apparatus (for example, another portable apparatus, a wearable apparatus, or a server) through a wireless local area network (WLAN) communication unit 131 and/or a short-range communication unit 132 according to control by the controller 110. The sub-communication unit 130 may receive data (or content) from the different apparatus according to control by the controller 110. The received data (or content) may be stored in the storage unit 175 according to control by the controller 110.

The WLAN communication unit 131 may be connected with an access point (AP) wirelessly in a place where the AP is installed according to control by the controller 110. The WLAN communication unit 131 may include, for example, WiFi. The WLAN communication unit 131 supports Institute of Electrical and Electronics Engineers (IEEE) WLAN standards (IEEE 802.11x). The short-range communication unit 132 enables wireless short-range communications between the portable apparatus 100 and an external apparatus without an AP according to control by the controller 110.

Short-range communications may include Bluetooth, BLE, IrDA, UWB, MST, and/or NFC.

MST may generate a magnetic signal corresponding to payment information (for example, mobile card information or the like) through a coil antenna (not shown) and may transmit the magnetic signal to the POS device 200.

The controller 110 may generate a pulse corresponding to transmission data (for example, payment information or the like) through MST, and the generated pulse may generate a magnetic signal. The portable apparatus 100 may transmit the generated magnetic signal to the POS device 200. For example, an MST coil antenna (not shown) may have an inductance of 10 to 20 μH.

The portable apparatus 100 may include one of the mobile communication unit 120, the WLAN communication unit 131, and the short-range communication unit 132 or a combination of the mobile communication unit 120, the WLAN communication unit 131, and the short-range communication unit 132 according to functions and/or performance. The portable apparatus 100 may connect to various external accessories (for example, a wireless speaker, a wireless headset, or the like) using one of the mobile communication unit 120 and the sub-communication unit 130.

In various embodiments of the present disclosure, the term "communication unit" includes the mobile communication unit 120 and/or the sub-communication unit 130.

The multimedia unit 140 may receive an external broadcast and may play an audio and/or video according to control by the controller 110. The multimedia unit 140 may include a broadcast communication unit 141, an audio player 142, or a video player 143.

The broadcast communication unit 141 may receive a broadcast signal (for example, a TV broadcast signal, a radio broadcast signal, or a data broadcast signal) and additional broadcast information (for example, an electronic program guide (EPG) or an electronic service guide (ESG)), which are sent from an external broadcasting station, through an antenna (not shown) according to control by the controller 110. Further, the controller 110 may control to play the received broadcast signal and additional broadcast information using the touch screen 190, a video codec (not shown), and an audio codec (not shown).

The audio player 142 may play an audio source (for example, an audio file identified by a file extension of mp3, wma, ogg, or wav) that is previously stored in the storage unit 175 of the portable apparatus 100 or that is received from the outside using the audio codec according to control by the controller 110.

According to an embodiment of the present disclosure, the audio player 142 may play an audio feedback corresponding to a change to a mobile payment screen according to a touch gesture input through the touch screen 190. For example, the audio player 142 may play, through the audio codec, an audio feedback (for example, an output from an audio source stored in the storage unit 175) corresponding to a change to a mobile payment screen according to a touch gesture input through the touch screen 190 according to control by the controller 110.

According to an embodiment of the present disclosure, the audio player 142 may play, through the audio codec, an audio feedback (for example, an output from an audio source stored in the storage unit 175) corresponding to a touch detected through the touch screen 190 or a continuous movement of the touch according to control by the controller 110.

The video player 143 may play a digital video source (for example, a video file identified by a file extension of mpeg, mpg, mp4, avi, mov, or mkv) that is previously stored in the storage unit 175 of the portable apparatus 100 or that is received from the outside using the video codec according to control by the controller 110. A multimedia application installable on the portable apparatus 100 may play the audio source or video source using the audio codec and/or video codec. Further, a multimedia application installable on the portable apparatus 100 may play the video source using a hardware codec (not shown) and/or software codec (not shown).

According to an embodiment of the present disclosure, the video player 143 may play a visual feedback corresponding to a change to a mobile payment screen according to a touch gesture input through the touch screen 190. For example, the video player 143 may play, through the video codec, a visual feedback (for example, an output from a video source stored in the storage unit 175) corresponding to a change to a mobile payment screen according to a touch gesture input through the touch screen 190 according to control by the controller 110.

It would be easily understood by a person skilled in the art that various kinds of video codec and audio codec capable of playing audio/video files with various file extensions are manufactured and commercially available.

The multimedia unit 140 may include the audio player 142 and the video player 143, excluding the broadcast communication unit 141, depending on the performance or structure of the portable apparatus 100. Further, the controller 110 may also be configured to include the audio player 142 or the video player 143 of the multimedia unit 140.

In various embodiments of the present disclosure, the term "audio codec" may include one or more pieces of audio codec. In various embodiments of the present disclosure, the term "video codec" may include one or more pieces of video codec.

The camera 150 may take a still image or a video according to control by the controller 110. The camera 150 may include at least one of the first camera 151 on the front side 100a and the second camera 152 in FIG. 2 on the rear side (not shown). For example, the camera 150 may include one or both of the first camera 151 and the second camera 152. Further, the first camera 151 or the second camera 152 may include an auxiliary light source (for example, the flash 153) which supplies a necessary amount of light for taking images.

The camera 150 may be configured to include the first camera 151 on the front side 100a and to further include an additional camera (for example, a third camera (not shown)) adjacent to the first camera 151. For example, a space between the third camera (not shown) and the first camera 151 may be provided to be greater than 30 mm and to be less than 80 mm. When the camera 150 further includes the third camera (not shown), the controller 110 may take a 3D still image or a 3D video using the first camera 151 and the third camera (not shown).

The camera 150 may be configured to include the second camera 152 on the rear side and to further include an additional camera (for example, a fourth camera (not shown)) adjacent to the second camera 152. For example, a space between the fourth camera (not shown) and the second camera 152 may be provided to be greater than 30 mm and be less than 80 mm. When the camera 150 further includes the fourth camera (not shown), the controller 110 may take a 3D still image or a 3D video using the second camera 152 and the fourth camera (not shown). In addition, the cameras 151 and 152 may take wide-angle images, telephotos, and close-up images using an additional lens (not shown) that is detachable from a separate adaptor (not shown).

The GPS 155 periodically receives a signal (for example, GPS satellite orbit information, satellite time information, and a navigation message) from a plurality of GPS satellites (not shown) on the Earth's orbit. In the outdoor environment, the portable apparatus 100 may calculate positions of the plurality of GPS satellites (not shown) and the portable apparatus 100 using signals received from the plurality of GPS satellites (not shown) and may calculate a distance using a transmission/reception time difference. A position, time, or moving speed of the portable apparatus 100 may be calculated by triangulation. An additional GPS satellite may be needed for orbit correction or time correction. In the indoor environment where signals are received through the GPS 155 from the plurality of GPS satellites (not shown), the portable apparatus 100 may also calculate a position, time, or moving speed of the portable apparatus 100.

In the indoor environment, the portable apparatus 100 may detect the position or moving speed of the portable apparatus 100 using a wireless AP (not shown). Detecting the position of the portable apparatus 100 indoors may be performed using a cell identification (cell-ID) method using an ID of the wireless AP, an enhanced cell-ID method using the ID of the wireless AP and received signal strength (RSS), or an angle of arrival (AoA) method using an angle at which the portable apparatus 100 receives a signal transmitted from the AP.

Further, the portable apparatus 100 may detect the position or moving speed of the portable apparatus 100 positioned indoors using a radio beacon (not shown). It would be easily understood by a person skilled in the art that various methods, in addition to the foregoing methods, may be used to detect the indoor position of the portable apparatus 100.

The input/output unit 160 may include at least one of one or more buttons 161, one or more microphones 162, one or more speakers 163, one or more vibration motors 164, a connector 165, a keypad 166, and an input pen 167.

Referring to FIGS. 14A, 4B, 5A-5C, 5E, and 5F, the buttons 161 include a home button 161a, a recent app button 161b, and/or a back button 161c positioned on a lower portion of the front side 100a of the portable apparatus 100. The buttons 161 may include a power/lock button 161d and at least one volume button 161e positioned on a lateral side 100b of the portable apparatus 100. Further, the buttons 161 of the portable apparatus 100 may include the home button 161a, the power/lock button 161d, and the volume button 161e only. The buttons 161 may be provided not only as a physical button but also as a touch button. Further, the buttons 161 of the portable apparatus 100 may be displayed in the form of a text, an image, or an icon on the touch screen 190.

The controller 110 may receive a signal generated from the buttons 161 corresponding to a user input. The controller 110 may detect the user input using the received signal (for example, a push of the buttons 161 or a touch of the buttons 161). The controller 110 may change a screen of the touch screen corresponding to the user input or may receive fingerprint information corresponding to a user fingerprint.

Shapes, positions, functions, and names of the buttons 161 illustrated in FIGS. 1, 4A, 4B, 5A-5C, 5E, and 5F are examples for description. It would be easily understood by a person skilled in the art that the shapes, positions, functions, and names of the buttons 161 may be altered, changed, or modified, without being limited thereto.

The microphone 162 receives a voice or sound from the outside to generate an electrical signal according to control by the controller 110. The electrical signal generated from the microphone 162 may be converted in the audio codec and be stored in the storage unit 175 or output through the speaker 163 according to control by the controller 110. One or more microphones 162 may be positioned on the front side 100a, the lateral side 100b, and/or the rear side of the portable apparatus 100. Alternatively, one or more microphones 162 may be positioned only on the lateral side 100b of the portable apparatus 100.

The speaker 163 may output sounds corresponding to various signals (for example, a radio signal, a broadcast signal, an audio source, a video file, photographing, or the like), decoded by the audio codec, according to control by the controller 110.

The speaker 163 may output a sound corresponding to a function performed via the portable apparatus 100 (for example, a touch operation sound corresponding to a phone number input or a photographing operation sound). One or a plurality of speakers 163 may be positioned on the front side 100a, the lateral side 100b, and/or the rear side of the portable apparatus 100. One or a plurality of speakers may be positioned on the front side 100a of the portable apparatus 100. One speaker may be positioned on each of the front side 100a and the rear side of the portable apparatus 100. One speaker 163 may be positioned on the front side 100a of the portable apparatus 100 and a plurality of speakers (not shown) may be positioned on the rear side.

A plurality of speakers (not shown) may be positioned on the lateral side 100b of the portable apparatus 100. The portable apparatus 100, which has an additional speaker (not shown) positioned on the lateral side 100b of the portable apparatus 100, may provide a user with a sound effect that is distinguished from one provided from a different portable apparatus (not shown) having speakers positioned on the front side 100a and the rear side.

According to an embodiment of the present disclosure, the speaker 163 may output an audio feedback corresponding to content that is changed corresponding to a change to a mobile payment screen. For example, the speaker 163 may output an audio feedback corresponding to content that is changed corresponding to a change to a mobile payment screen according to control by the controller 110.

The vibration motor 164 may convert an electrical signal into mechanical vibrations according to control by the controller 110. The vibration motor 164 may include a linear vibration motor, a bar-type vibration motor, a coin-type vibration motor, or a piezoelectric element vibration motor. For example, when a voice call request is received from a different portable apparatus (not shown), the vibration motor 164 may operate in the portable apparatus 100 in a vibration mode according to control by the controller 110.

One or more vibration motors 164 may be positioned in the portable apparatus 100. Further, the vibration motor 164 may vibrate the entire portable apparatus 100 or may locally vibrate only a portion of the portable apparatus 100.

According to an embodiment of the present disclosure, the vibration motor 164 may output a haptic feedback corresponding to a change to a mobile payment screen according to a touch gesture input through the touch screen 190. For example, the vibration motor 164 may output a haptic feedback corresponding to a change to a mobile payment screen according to a touch gesture input through the touch screen 190 according to control by the controller 110. Further, the vibration motor 164 may provide various haptic feedbacks (for example, intensities of vibrations and periods of vibration times) previously stored or received from the outside based on a control command from the controller 110.

The connector 165 may be used as an interface to connect the portable apparatus 100 and an external apparatus (not shown) or power source (not shown).

The portable apparatus 100 may transmit data (or content) stored in the storage unit 175 to the outside or receive data (or content) from the outside through a wire-based cable connected to the connector 165 according to control by the controller 110. The portable apparatus 100 may be supplied with power from the power source (not shown) or may charge a battery (not shown) through the wire-based cable connected to the connector 165 according to control by the controller 110. Further, the portable apparatus 100 may be connected with an accessory (for example, a speaker (not shown) and a keyboard dock (not shown)) through the connector 165.

The keypad 166 may receive a key input from the user to control the portable apparatus 100. The keypad 166 includes a physical keypad (not shown) formed on the front side 100*a* of the portable apparatus 100, a virtual keypad (not shown) displayed in the touch screen 190, and a physical keypad (not shown) connectable wirelessly or via a cable. It would be easily understood by a person skilled in the art that the physical keypad (not shown) formed on the front view 100*a* of the portable apparatus 100 may be excluded depending on performance or a structure of the portable apparatus 100.

The input pen 167 may touch (or select), by the user, an object (for example, a menu, a text, an image, a video, a figure, an icon, and a shortcut icon) displayed (formed) on the touch screen 190 of the portable apparatus 100 or on a screen of a write/draw application (a menu screen, a notepad screen, a calendar screen, and the like).

The input pen 167 may touch or select, by the user, content (for example, a text file, an image file, an audio file, a video file, or a webpage) displayed on the touch screen 190 of the portable apparatus 100 or on the screen of the write/draw application (the menu screen, the notepad screen, the calendar screen, and the like).

The input pen 167 may handwrite, draw, paint or sketch, by the user, on a screen of a write application (for example, a memo screen) or a draw application (for example, a canvas screen) displayed on the touch screen 190 of the portable apparatus 100.

The input pen 167 may input letters by touching a capacitive touch screen, a resistive touch screen, or an electromagnetic resonance (EMR) touch screen (including edge touch screens) or using a displayed virtual keypad. The input pen 167 may include a stylus pen or a haptic pen (not shown), which has a vibrating embedded vibration element (for example, an actuator or vibration motor). Further, the input pen 167 may operate (for example, vibrate) the vibration element corresponding to not only control information received from the portable apparatus 100 but also sensing information detected by a sensor embedded in the input pen 167 (for example, an acceleration sensor, not shown).

When the input pen 167 is drawn out of the insertion hole (not shown), the controller 110 may run the set write/draw application and display the screen (not shown) of the write/draw application on the touch screen 190.

The input pen 167 may include a user's finger (for example, a thumb). For example, a writing or drawing may be input using a user's finger via the application displayed on a capacitive touch screen (including a capacitive edge touch screen) or a resistive touch screen (including a resistive edge touch screen).

When the writing or drawing is input with the user's finger via the application displayed on the capacitive edge touch screen or resistive edge touch screen, the controller 110 may detect a touch by one of the fingers, including a thumb, using the touch screen 190 or touch screen controller 195.

It would be easily understood by a person skilled in the art that a shape of the insertion hole (not shown) of the portable apparatus 100 and/or a shape (for example, a circular cross section or polygonal cross section) or structure (for example, including a battery (not shown)) of the input pen 167 may be changed depending on performance or a structure of the portable apparatus 100.

The sensor unit 170 may detect a state of the portable apparatus 100 and/or an ambient state of the portable apparatus 100. The sensor unit 170 may include one or a plurality of sensors. For example, the sensor unit 170 may include the proximity sensor 171 to detect whether the user approaches the portable apparatus 100, the illuminance sensor 172 to detect the amount of ambient light of the portable apparatus 100, or the fingerprint sensor 173 to detect a fingerprint of the user using the portable apparatus 100.

The fingerprint sensor 173 may be positioned on the front side 100*a* of the portable apparatus 100. The fingerprint sensor 173 may be positioned below the touch screen 190 of the portable apparatus 100. The fingerprint sensor 173 may be positioned in a bezel below the touch screen 190. The fingerprint sensor 173 may be positioned close to (for example, 1 mm or greater distant from) the touch screen 190 of the portable apparatus 100.

The fingerprint sensor 173 may be installed in a button (for example, the home button 161*a*) of the portable apparatus 100. The fingerprint sensor 173 may be installed in the touch screen 190 of the portable apparatus 100. When the fingerprint sensor 173 is installed in the touch screen 190, the touch screen 190 may be a fingerprint recognition-integrated touch screen (or a fingerprint recognition-integrated capacitive touch screen, not shown).

The fingerprint sensor 173 may include an optical fingerprint sensor (not shown) to capture a fingerprint image, an ultrasonic fingerprint sensor (not shown), a capacitive fingerprint sensor (not shown), a semiconductor fingerprint sensor (not shown) to detect electrical conductivity, a heat detection fingerprint sensor (heart rate sensor, not shown), and combinations of the foregoing fingerprint sensors. It would be easily understood by a person skilled in the art that the fingerprint sensor 173 may be provided as various fingerprint sensors in addition to the foregoing fingerprint sensors.

The sensor unit 170 may include an acceleration sensor (not shown) to detect three-axes (for example, x-axis, y-axis, and z-axis) accelerations applied to the portable apparatus 100, a gravity sensor to detect a direction of exerted gravity, or an altimeter, which measures atmospheric pressure to detect an altitude.

The sensor unit 170 may measure motion acceleration and gravitational acceleration of the portable apparatus 100. When the portable apparatus 100 remains stationary, the sensor unit 170 may measure the gravitational acceleration only. The sensor unit 170 may further include a heart rate sensor (not shown) to detect heart rate of the user.

At least one sensor included in the sensor unit 170 detects a state of the portable apparatus 100, and generates and transmits an electrical signal corresponding to a detection to the controller 110. It would be easily understood by a person skilled in the art that sensors included in the sensor unit 170 may be added, changed, or deleted depending on performance of the portable apparatus 100.

The storage unit 175 may store signals or data input/output corresponding to operations of the mobile communication unit 120, the sub-communication unit 130, the multimedia unit 140, the camera 150, the GPS 155, the input/output unit 160, the sensor unit 170, and the touch screen 190 according to control by the controller 110. The storage unit 175 may store GUIs associated with control programs to control the portable apparatus 100 or the controller 110 and applications provided from a manufacturer or downloaded from the outside, images for providing the GUIs, user information, documents, databases, or relevant data.

According to an embodiment of the present disclosure, the storage unit 175 may store portable apparatus information including resolution information and size information on the touch screen 190 and server information on a server (not shown) that is connectable with the portable apparatus 100.

The storage unit 175 may store size and resolution information on an edge touch screen (not shown). Further, the storage unit 175 may store curvature information on the edge touch screen (not shown).

Figure 4A:
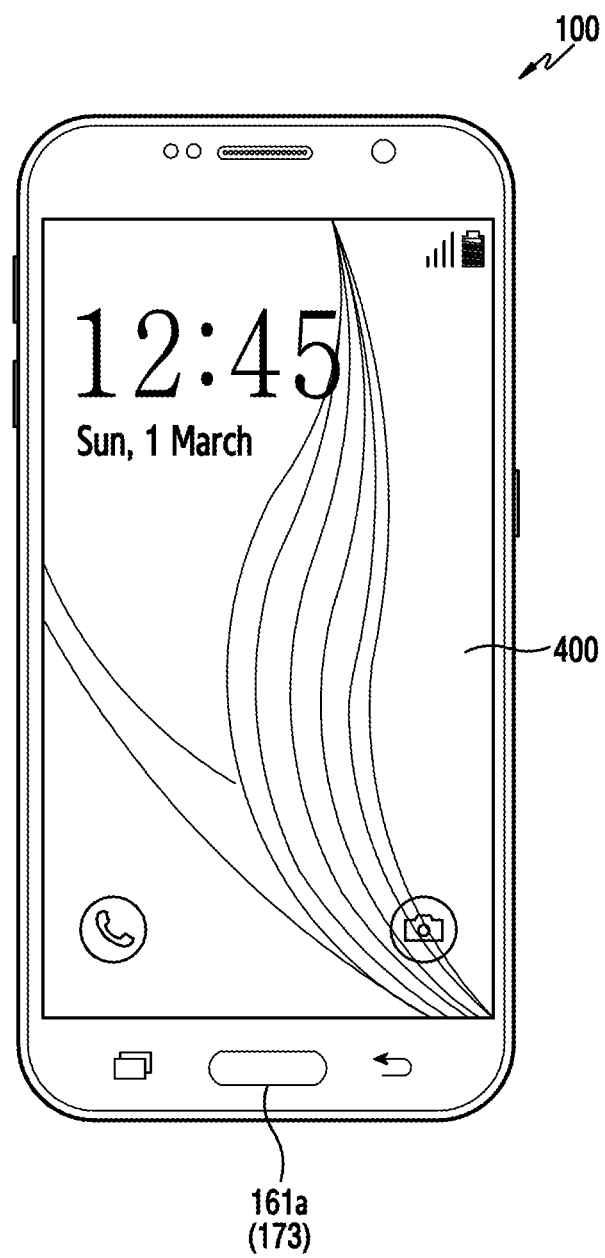
FIGS. 4A to 4G illustrate examples of a screen on an electronic device according to an embodiment of the present disclosure.
Figure 4B:
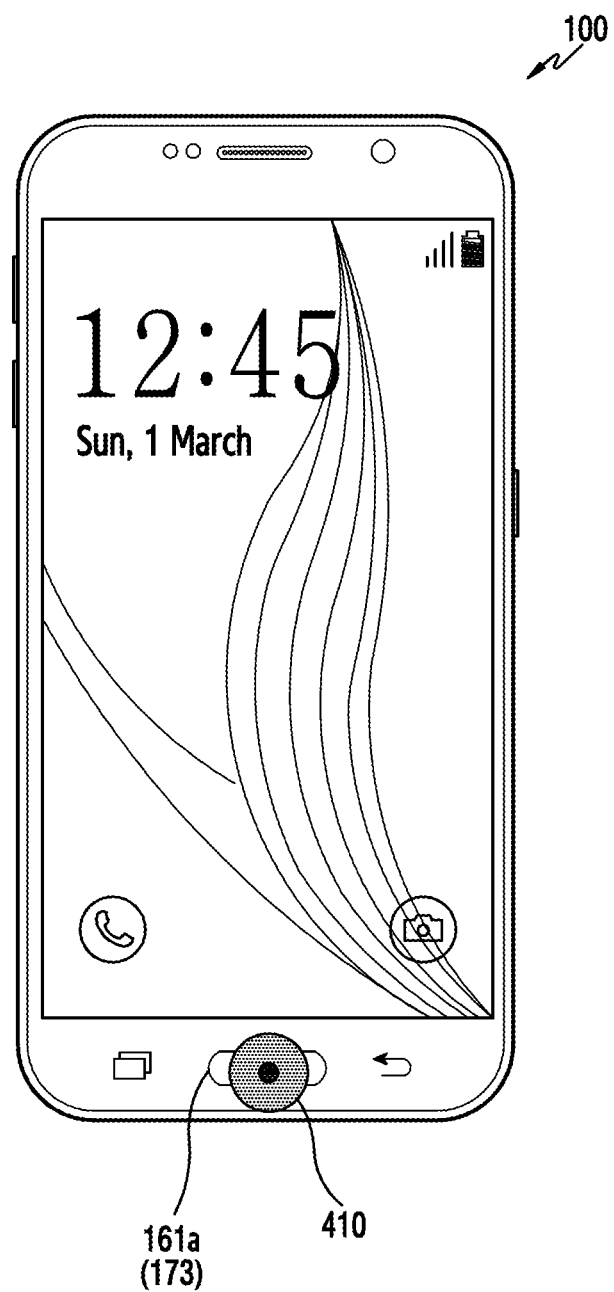
Figure 4C:
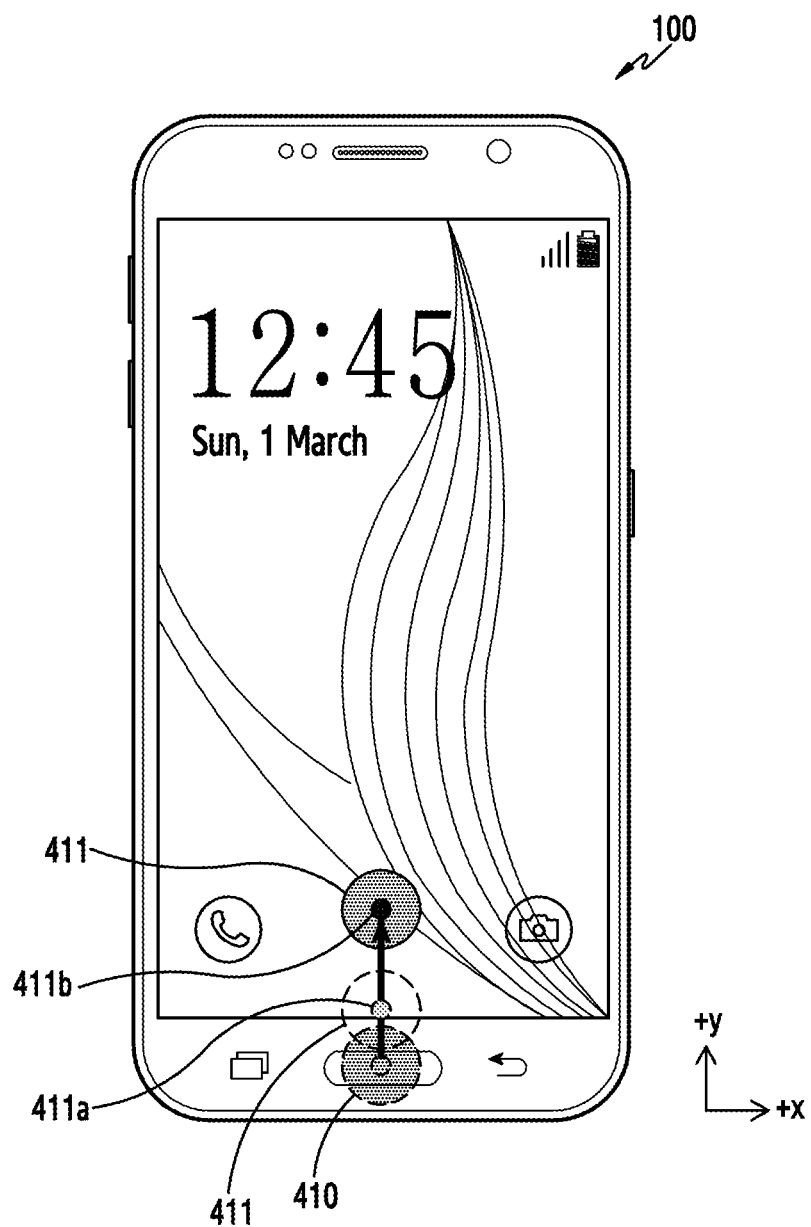
Figure 4D:
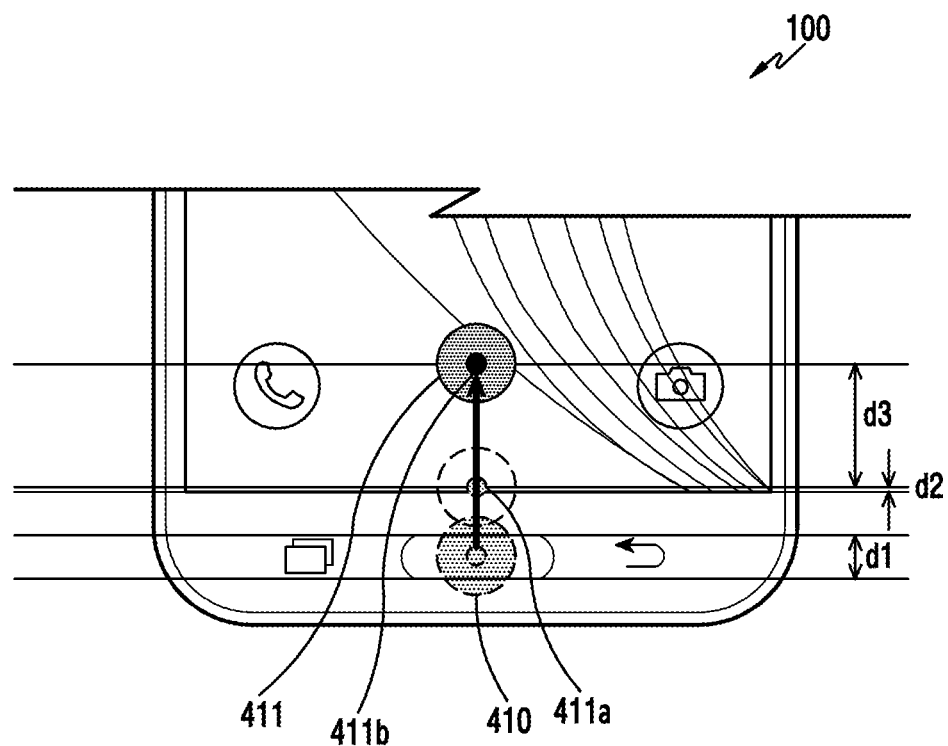
Figure 4E:
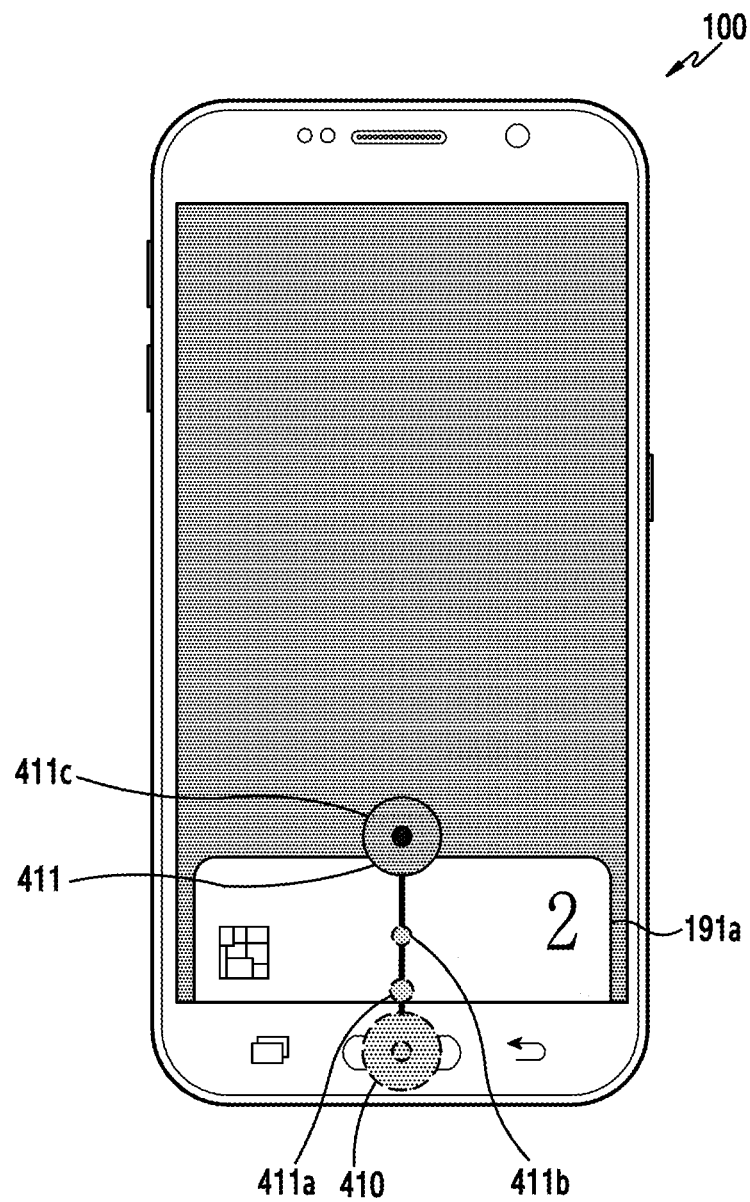
Figure 4F:
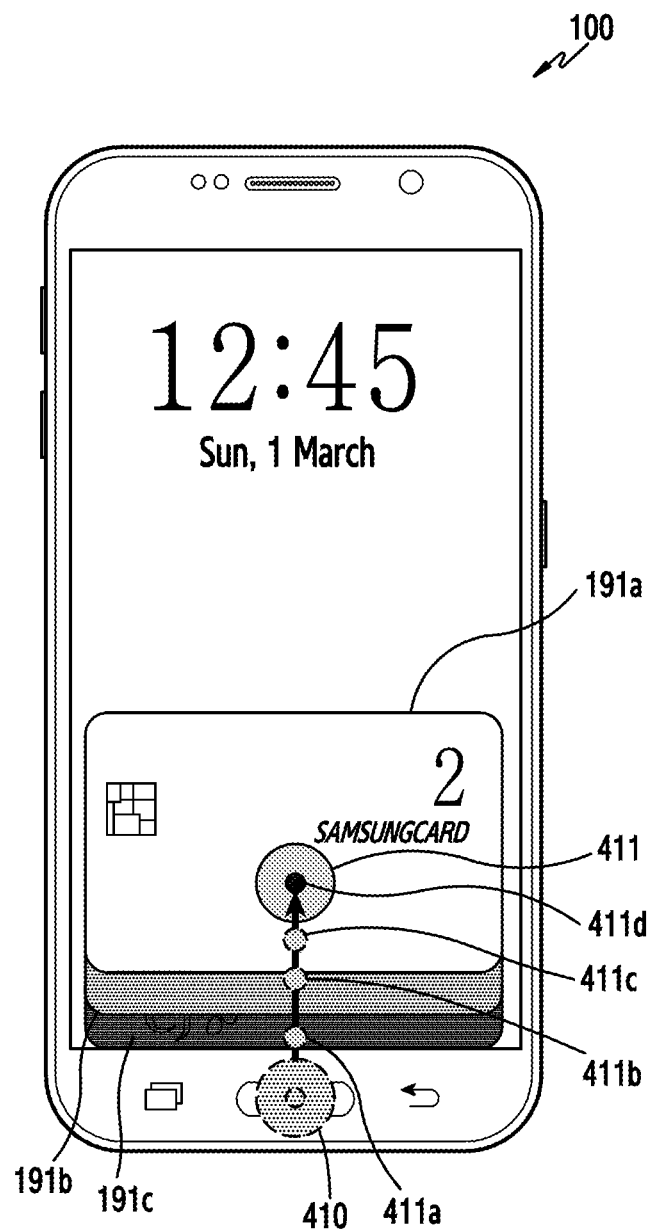
Figure 5A:
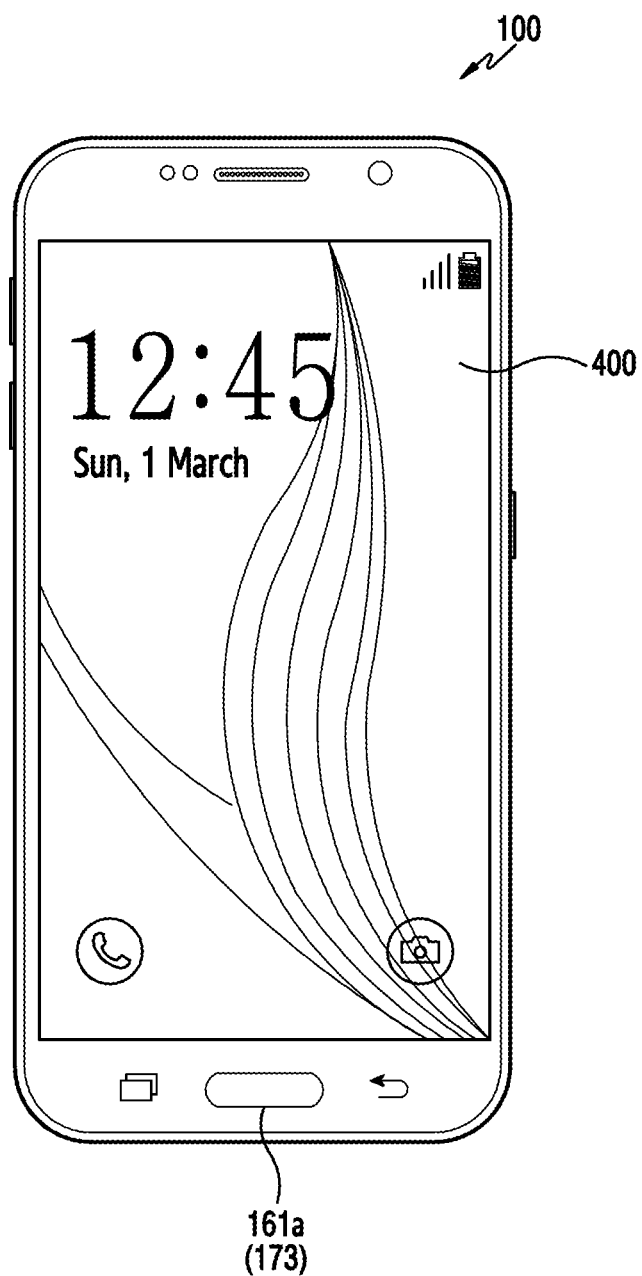
FIGS. 5A to 5H illustrate examples of a screen on an electronic device according to an embodiment of the present disclosure.
Figure 5B:
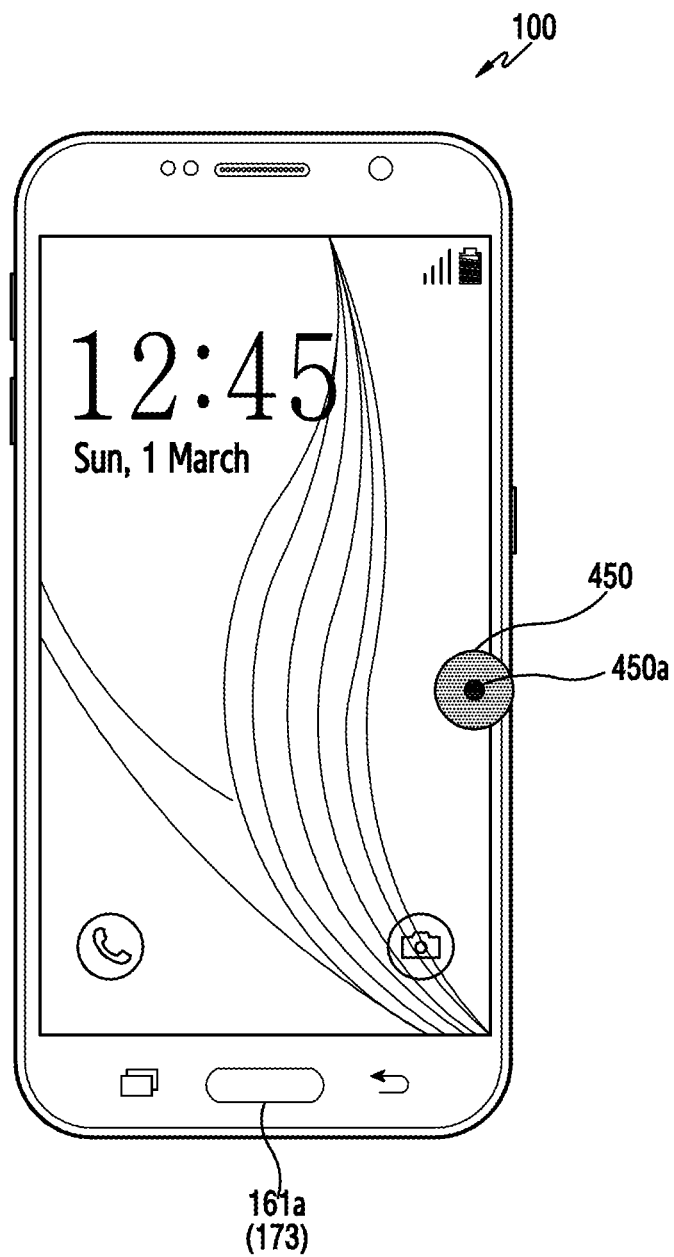
Figure 5C:
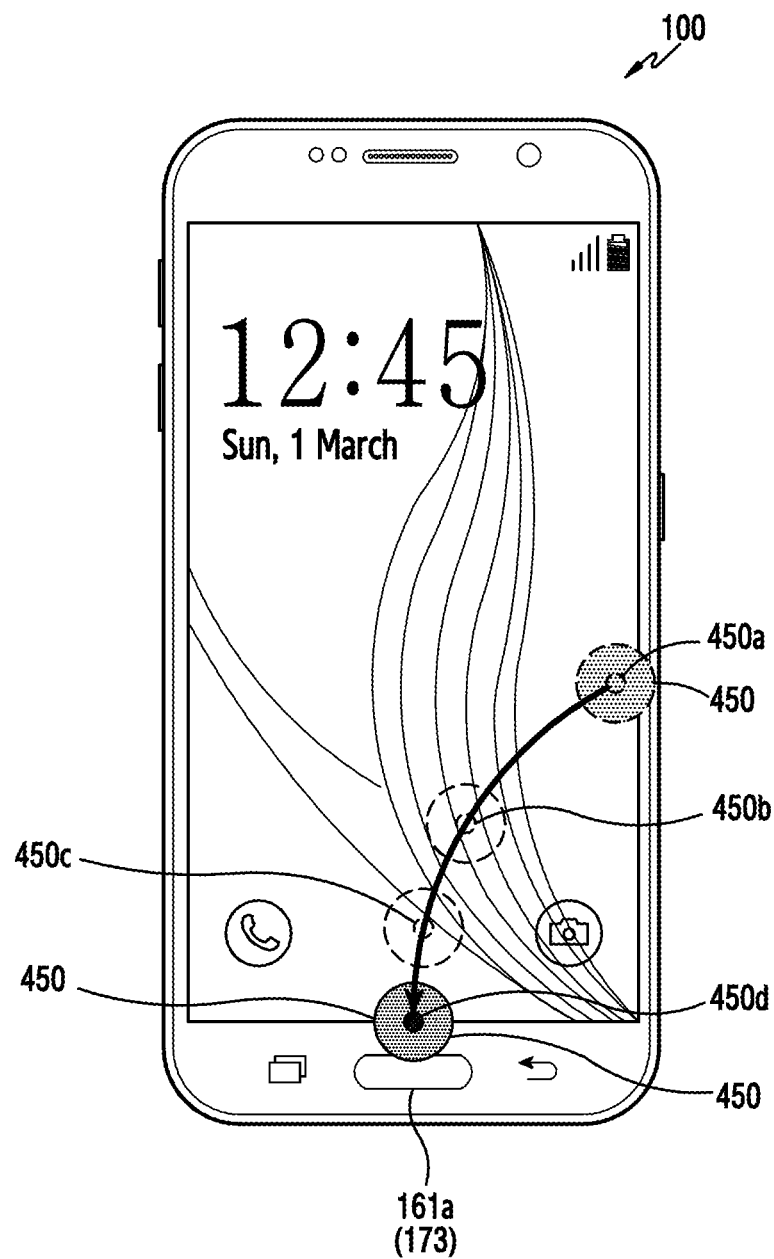
Figure 5D:
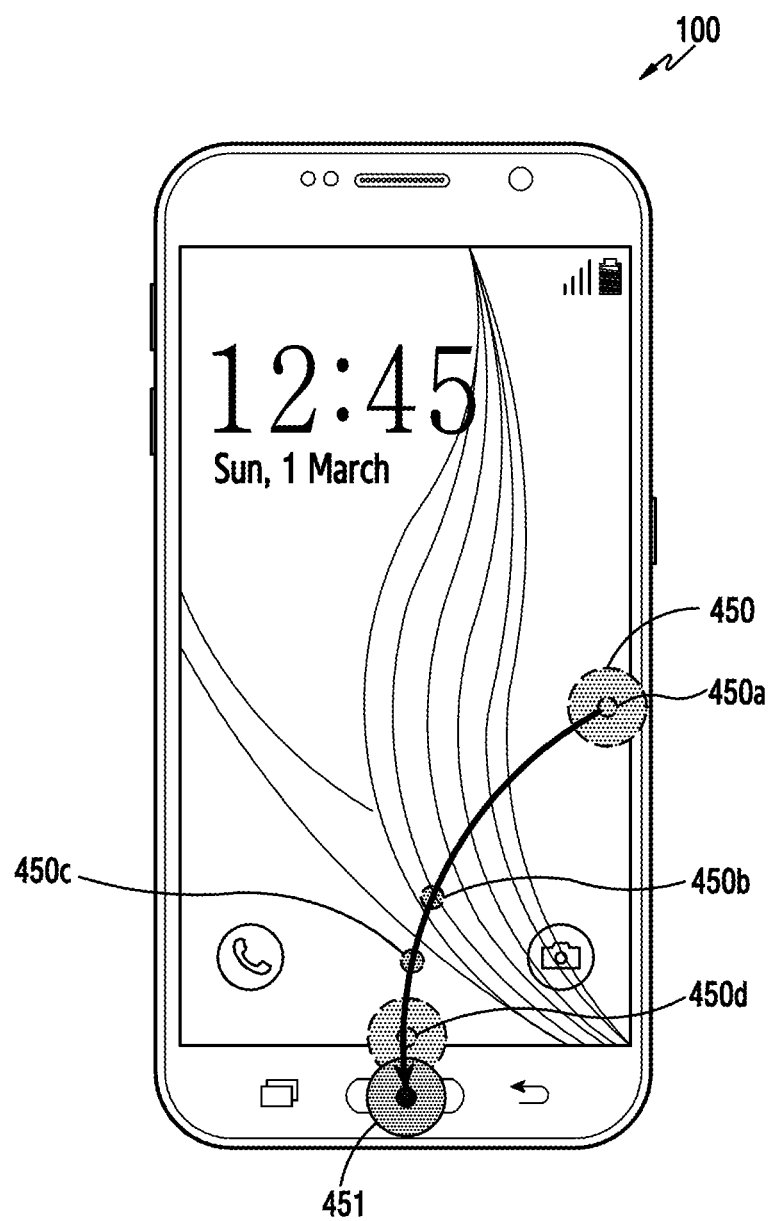
Figure 5E:
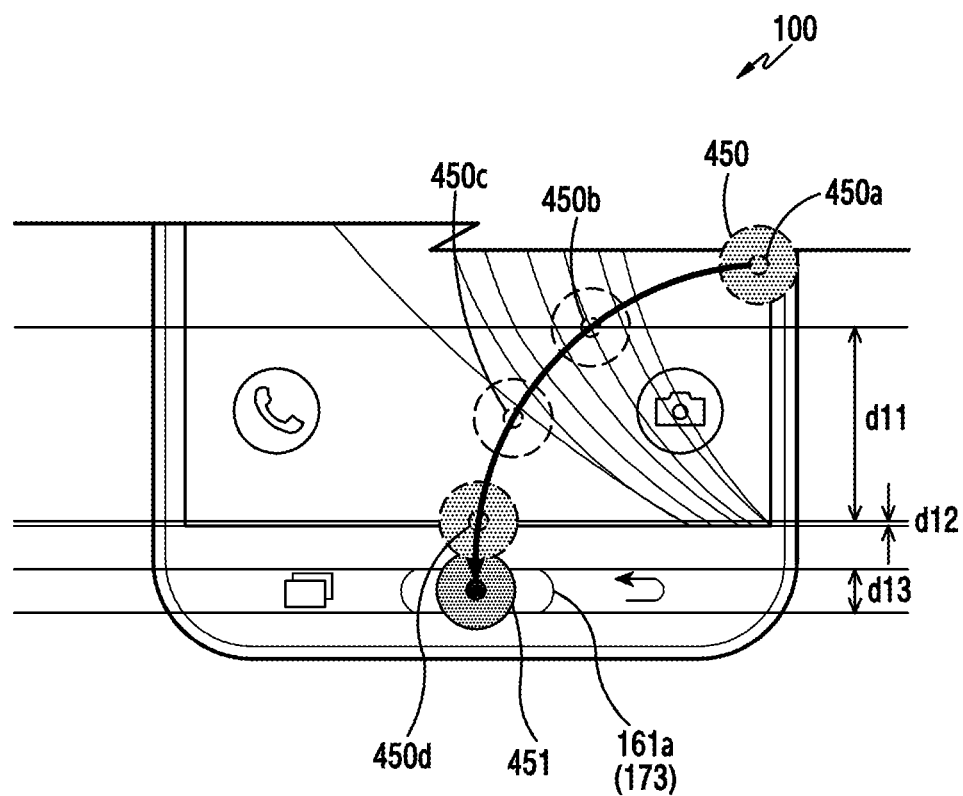
Figure 5F:
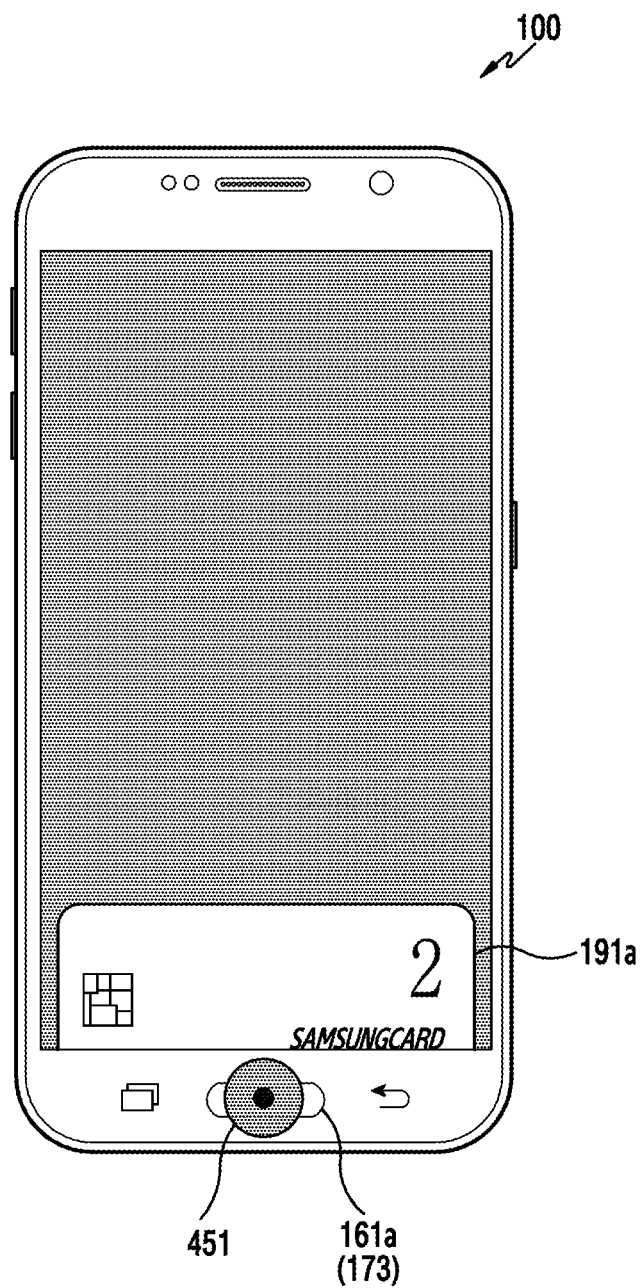

The storage unit 175 may store first input information corresponding to a first input 410 (see FIGS. 4B to 4F) and eleventh input information corresponding to an eleventh input 451 (see FIGS. 5D to 5F).

The storage unit 175 may store first touch position information corresponding to a first touch 411 (see FIGS. 4C to 4F) and eleventh touch position information corresponding to an eleventh touch 450 (see FIGS. 5B to 5E).

The storage unit 175 may store position information on a plurality of touches (for example, at an initial position, an intermediate position, a final position, or the like) corresponding to a continuous movement of the first touch 411 and position information on a plurality of touches (for example, at an initial position, an intermediate position, a final position, or the like) corresponding to a continuous movement of the eleventh touch 450.

The storage unit 175 may store fingerprint recognition area information on each of fingerprint recognition areas d1 and d13 (see FIGS. 4D and 5E), bezel touch area information on each of bezel touch areas d2 and d12 (see FIGS. 4D and 5E), and swipe region information on each of swipe areas d3 and d11 (see FIGS. 4D and 5E).

The storage unit 175 may store time interval T1 information and setting area A1 information.

The storage unit 175 may store a mobile payment application (for example, Samsung Pay or the like) using the portable apparatus 100 and/or data (for example, mobile payment information or the like).

The storage unit 175 may store one or a plurality of pieces of registered mobile card information (for example, a card number, an owner's name, an expiration date, or the like). Further, the storage unit 175 may store payment information on a registered mobile card (for example, mobile card information, a payment time, a payment place, or the like).

The storage unit 175 may store a user-recognizable visual feedback (for example, a video source or the like) output on the touch screen 190 corresponding to user authentication with a fingerprint, passing through the swipe areas d1 and d11, and/or display of a mobile payment screen, a user-recognizable audio feedback (for example, a sound source or the like) output from the speaker 163, and a user-recognizable haptic feedback (for example, a haptic pattern or the like) output from the vibration motor 164.

The storage unit 175 may store a feedback providing time (for example, 500 ms) for a feedback provided for the user.

The storage unit 175 may store an application and/or data corresponding to a user fingerprint recognition function through the fingerprint sensor 173 of the portable apparatus 100. For example, the storage unit 175 may store one or a plurality of applications corresponding to fingerprint scanning through the fingerprint sensor 173 and image processing and an input/output of the scanned fingerprint. Further, the storage unit 175 may store data processed via one or a plurality of applications (for example, a previously registered user fingerprint, characteristics of the user fingerprint, or the like).

In various embodiments of the present disclosure, the term "storage unit" includes the storage unit 175, the ROM 112 and RAM 113 in the controller 110, or a memory card (not shown, for example, a micro SD or a memory stick) mounted on the portable apparatus 100. The storage unit 175 may include a nonvolatile memory, a volatile memory, a hard disk drive (HDD), or a solid state drive (SSD).

The power supply 180 may supply power to the components 120 to 195 positioned in the portable apparatus 100 according to control by the controller 110. The power supply 180 may supply the components of the portable apparatus 100 with power input from an external power source (not shown) through a wire-based cable (not shown) connected to the connector 165 according to control by the controller 110. Further, the power supply 180 may supply power to one or more batteries (not shown) to charge the batteries according to control by the controller 110. The one, two, or more batteries (not shown) may be positioned between the touch screen 190 positioned on the front side 100a and the rear side (not shown).

The power supply 180 may wirelessly charge (for example, using a magnetic resonance method, an electromagnetic wave method, or a magnetic induction method) the one, two, or more batteries (not shown) using a separate coil (not shown) according to control by the controller 110.

The touch screen 190 includes an edge touch panel (not shown) to receive a touch input and an edge display panel (not shown) to display a screen. The touch screen 190 may provide the user with GUIs corresponding to various services (for example, a voice call, a video call, data transmission, broadcast reception, photographing, video watching, or application execution). The touch screen 190 transmits an analog signal corresponding to a single touch or multi-touch input through a home screen 191 or a GUI to the touch screen controller 195. The touch screen 190 may receive a single touch or a multi-touch through a user body part (for example, fingers including a thumb) or the input pen 167.

The touch screen 190 may be an integrated edge touch screen with both lateral sides curved. Alternatively, the touch screen 190 may be an integrated edge touch screen with one lateral side curved.

The edge touch screen (not shown) may have one of a single curvature or a multi-curvature. For example, the single curvature may be 13 R or greater and 5 R or smaller. One of one lateral side and both lateral sides of the portable apparatus 100 including an edge touch screen with a single curvature may have a semicircular or oval cross section (not shown).

A first curvature of the multi-curvature may be 12 R or 13 R. The first curvature may be 13 R or greater and 5 R or smaller. A remaining second curvature of the multi-curvature may be 6.5 R or 6.9 R. The second curvature may be 8 R or greater and 4 R or smaller. One of one lateral side and both lateral sides of the portable apparatus 100 including an edge touch screen with a multi-curvature may have a semicircular or oval cross section (not shown).

The single curvature value and/or the multi-curvature value in an embodiment of the present disclosure are examples only, without being limited thereto. It would be easily understood by a person skilled in the art that a single curvature value and/or multi-curvature value may be changed.

The display panel (not shown) includes a plurality of pixels and displays an image through the pixels. For example, the edge display panel (not shown) may include a liquid crystal display (LCD), a LED, or an OLED. The edge display panel (not shown) may display various images and a plurality of objects according to various operation states of the portable apparatus 100 and the execution of an application or service.

According to an embodiment of the present disclosure, a touch includes not only a contact between the touch screen 190 and a user body part or the input pen 167 but a non-contract therebetween. For example, the non-contact may include a hovering with a space between the touch screen 190 and a user body part or the input pen 167 being 50 mm or shorter. It would be easily understood by a person skilled in the art that a non-contact space that is detectable through the touch screen 190 may be changed depending on the performance or structure of the portable apparatus 100.

The touch screen 190 may be provided as a resistive type, a capacitive type, an infrared type, or an ultrasonic wave (acoustic wave) type.

The touch screen 190 may include an EMR type. The EMR edge touch screen further includes a separate EMR edge touch panel (not shown) to receive an input with an input pen (not shown) having a resonance circuit that resonates with an EMR loop coil.

According to an embodiment of the present disclosure, the touch screen 190 may output a visual feedback corresponding to a change to a mobile payment screen according to a touch gesture input through the touch screen 190. The touch screen 190 may display a visual feedback corresponding to changed content corresponding to a change to a mobile payment screen according to a touch gesture input through the touch screen 190 according to control by the controller 110.

In an embodiment of the present disclosure, the display may include the touch screen 190.

The touch screen controller 195 converts the analog signal corresponding to the single touch or multi-touch received from the touch screen 190 into a digital signal and transmits the digital signal to the controller 110. The controller 110 may calculate an X coordinate and a Y coordinate corresponding to a touch position of the touch input through the touch screen 190 using the digital signal received from the touch screen controller 195.

The controller 110 may control the touch screen 190 using the digital signal received from the touch screen controller 195. For example, the controller 110 may display a shortcut icon displayed corresponding to the input touch on the touch screen 190 to be distinguished from another shortcut icon or may run an application (for example, a call) corresponding to a selected shortcut icon to display an application screen on the touch screen 190.

The touch screen controller 195 may be provided as a single touch screen controller or a plurality of touch screen controllers. The touch screen controller 195 may be included in the controller 110 according to the performance or structure of the portable apparatus 100.

The touch screen controller 195 may convert an analog signal corresponding to a touch received through the EMR edge touch screen, which is separate from the analog signal corresponding to the single touch or multi-touch received from the touch screen 190, into a digital signal and may transmit the digital signal to the controller 110. The controller 110 may calculate an X coordinate and a Y coordinate corresponding to a touch position on the touch screen through the EMR touch screen using the digital signal received from the touch screen controller 195. The EMR touch screen may use an EMR touch screen controller (not shown).

Although FIGS. 1 and 2 illustrate the portable apparatus 100 including the touch screen only, a plurality of touch screens may be provided. Each touch screen may be positioned in each housing (not shown), and the housings (not shown) may be connected to each other via one or a plurality of hinges (not shown).

A plurality of touch screens may be disposed up and down or right and left on a front side of one housing (not shown). The plurality of touch screens may include one display panel and a plurality of touch panels. The plurality of touch screens may include a touch panel corresponding to a plurality of display panels. In addition, the plurality of touch screens may include a plurality of touch panels corresponding to a plurality of display panels.

It would be easily understood by a person skilled in the art that at least one component may be added to the portable apparatus 100 illustrated in FIGS. 1 and 2, or at least one of the components of the portable apparatus 100 may be changed or deleted depending on performance of the portable apparatus 100.

Figure 3A:
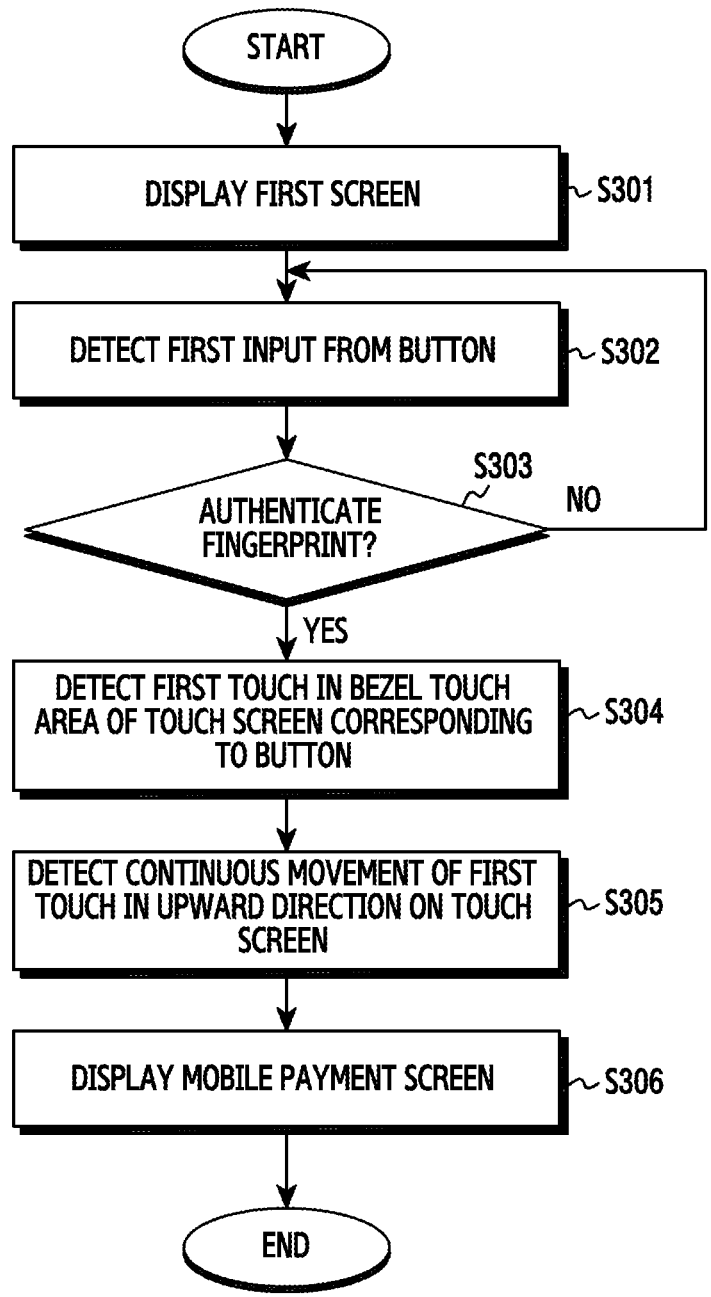
FIG. 3A is a schematic flowchart illustrating a screen change method of a portable apparatus according to an embodiment of the present disclosure.

FIG. 3A is a schematic flowchart illustrating a screen change method of a portable apparatus according to an embodiment of the present disclosure.

FIGS. 4A to 4G illustrate examples of a screen on a portable apparatus according to an embodiment of the present disclosure.

In operation S301 of FIG. 3A, a first screen is displayed on the touch screen.

Referring to FIG. 4A, a lock screen 400 as one first screen is displayed on the touch screen 190 according to control by the controller 110. The first screen may include not only the lock screen 400 but also a home screen (not shown), a screen of another running application (in-application screen, not shown), or a touch screen off screen (LDC off screen, not shown).

It would be easily understood by a person skilled in the art that the first screen includes not only the foregoing screens but also various screens to be displayed on the portable apparatus 100. Also, it would be easily understood by a person skilled in the art that the other running applications may vary.

The home button 161a is positioned below the touch screen 190 positioned on the front side 100a of the portable apparatus 100. Further, the home button 161a including the fingerprint sensor 173 may be positioned below the touch screen 190 of the portable apparatus 100.

In operation S302 of FIG. 3A, a first input is detected from the home button.

Referring to FIG. 4B, a user provides the first input 410 through the home button 161a. The controller 110 may detect the first input 410 using a push of the home button 161a or the touch of the home button 161a.

The controller 110 may store first input information corresponding to the detected first input 410 in the storage unit 175. The stored first input information may include a touch ID, a touch position, a touch detection time, or the like for record management.

When the first screen is displayed on the touch screen 190 of the portable apparatus 100, the controller 110 may supply power to the home button 161a or the home button 161a with the fingerprint sensor 173. The controller 110 may always supply power to the home button 161a or the home button 161a with the fingerprint sensor 173. The first input 410 by the user may be detected from the home button 161a or from the home button 161a with the fingerprint sensor 173.

The first input 410 detected from (for example, touching or hovering on) the touch screen 190 may be generated, for example, by a touch with one finger including a thumb or the touchable input pen 167. Further, the first input 410 may be generated with either of the right and left hands.

In operation S303 of FIG. 3A, a user fingerprint is authenticated.

Referring to FIGS. 4B and 4D, the controller 110 may receive fingerprint information corresponding to the user fingerprint using the fingerprint sensor 173 installed in the home button 161a. The controller 110 may receive the fingerprint information corresponding to the user fingerprint through a fingerprint recognition area d1 of the fingerprint sensor 173. The fingerprint recognition area d1 may be changed corresponding to the size and/or shape of the home button 161a with the fingerprint sensor 173. Further, the fingerprint recognition area d1 may be changed corresponding to the size and/or resolution of the fingerprint sensor 173 installed in the home button 161a.

The controller 110 may extract a fingerprint characteristic corresponding to the user from the received fingerprint information. The controller 110 may compare the extracted fingerprint characteristic with user fingerprint information (for example, including a fingerprint characteristic) previously registered in a fingerprint database in the storage unit 175 to authenticate the user fingerprint. Alternatively, the controller 110 may compare the extracted fingerprint characteristic with user fingerprint information (for example, including a fingerprint characteristic) previously registered in an external server (not shown) using the communication unit to authenticate the user fingerprint.

The controller 110 may use the optical fingerprint sensor (not shown) which irradiates visible light in order to receive a reflected fingerprint image. The controller 110 may use the ultrasonic fingerprint sensor (not shown), which irradiates ultrasonic waves to receive a reflected fingerprint image. The controller 110 may use the capacitive fingerprint sensor (not shown), which calculates a capacitance difference to obtain fingerprint information.

The user may swipe from the home button 161a or touch the home button 161a (with the fingerprint sensor 173) for a set time (for example, 1.5 sec or less). The controller 110 may compose one-dimensional (1D) fingerprint images, which are received using a sensor electrode linearly disposed with respect to a finger (for example, which is fingerprint-detectable) of the swiping user, into a two-dimensional (2D) fingerprint image. Further, the controller 110 may receive a 2D fingerprint image using a sensor electrode disposed two-dimensionally corresponding to a finger of the user touching the home button 161a with the fingerprint sensor 173.

It would be easily understood by a person skilled in the art that various methods may be used for authenticating the user fingerprint using the received fingerprint information.

When the user fingerprint is not authenticated in operation S303 of FIG. 3A, operation S302 is repeated.

When the user fingerprint is authenticated in operation S303 of FIG. 3A, operation S304 is performed.

In operation S304 of FIG. 3A, a first touch is detected in a bezel touch area of the touch screen corresponding to the home button.

Referring to FIGS. 4B, 4C, and 4D, the user provides the first touch 411 in the bezel touch area d2 of the touch screen 190 positioned in an upward direction (for example, the +y-axis direction) from the home button 161a. The controller 110 may detect the first touch 411 in the bezel touch area d2 using the touch screen 190 and the touch screen controller 195. The controller 110 may calculate a first touch position 411a (for example, an X2 coordinate and a Y2 coordinate) corresponding to the first touch 411 detected in the bezel touch area d2 using an electrical signal received from the touch screen controller 195.

The controller 110 may detect, in the bezel touch area d2, the first touch 411, which is connected from the first input 410 detected in the fingerprint recognition area d1, and the first touch 411 separate from the first input 410.

The first touch 411 detected in the bezel touch area d2 may be included in a continuous movement (for example, a swipe as one touch gesture) of the first input 410 detected in the fingerprint recognition area d1. Alternatively, the first touch 411, which is separate from the first input 410 which is touch-released at the home button 161a, may be touched on the bezel touch area d2.

The vertical length of the bezel touch area d2 (for example, in the +y-axis direction based on an edge of the touch screen 190) may be 3% (for example, 77 pixels) or less of the resolution of the touch screen 190 (for example, 2560×1440 pixels). Alternatively, the vertical length of the bezel touch area d2 may be 5% (for example, 128 pixels) or less of the resolution of the touch screen 190.

The vertical length of the bezel touch area d2 (for example, in the +y-axis direction based on the edge of the touch screen 190) may be shorter than the vertical length of the fingerprint recognition area d1 (for example, in the +y-axis direction based on the bottom of the fingerprint recognition area d1). For example, the vertical length of the bezel touch area d2 may be 50% or less of the vertical length of the fingerprint recognition area d1.

Detection of the first touch 411 in the bezel touch area d2 may be calculated using a touch detection time of the first input 410 in the fingerprint recognition area d1.

The controller 110 may detect the first touch 411 in the bezel touch area d2 using a difference (for example, a first time interval T1, 1 sec or less) between a detection time t of the first input 410 in the fingerprint recognition area d1 and a detection time t1 of the first touch 411 in the bezel touch area d2.

The first touch 411 may be detected in the bezel touch area d2 within the first time interval T1. It would be easily understood by a person skilled in the art that the first time interval T1 may be changed.

Detection of the first touch 411 in the bezel touch area d2 may be calculated using a touch position of the first input 410 in the fingerprint recognition area d1.

The controller 110 may detect the first touch 411 in the bezel touch area d2 in a semicircular area which extends upwards (for example, in the +y-axis direction) from the touch position of the first input 410 in the fingerprint recognition area d1 and has a radius of 30 mm (for example, a first area A1 in the +y-axis direction) from a contact point with the touch screen 190 (for example, a position in the bezel touch area d2).

The first touch 411 may be detected in the first area A1 in the bezel touch area d2. It would be easily understood by a person skilled in the art that the first area A1 may be changed.

The controller 110 may store first touch position information corresponding to the first touch position 411a in the storage unit 175. The stored first touch position information may include a touch ID, a touch position, a touch detection time, or touch information (for example, touch pressure, a touch direction, touch duration, or the like) for record management.

The first touch 411 detected from (for example, touching or hovering on) the touch screen 190 may be generated, for example, by a touch with one finger including a thumb or the touchable input pen 167.

The first touch 411 may be generated with one of the right and left hands, which is different from one corresponding to the first input 410. For example, when the first input 410 is generated with the left hand, the first touch 411 may be generated with the right hand. On the contrary, when the first input 410 is generated with the right hand, the first touch 411 may be generated with the left hand.

In operation S305 of FIG. 3A, a continuous movement of the first touch in the upward direction on the touch screen is detected.

Referring to FIGS. 4C to 4F, the controller 110 may detect (or calculate) the continuous movement of the first touch 411 (for example, a plurality of X coordinates and Y coordinates corresponding to a continuous touch) detected in the bezel touch area d2 using the touch screen 190 and the touch screen controller 195. Position information corresponding to the continuous movement of the first touch 411 may be stored in the storage unit 175 according to control by the controller 110.

The continuous movement of the first touch 411 (for example, a movement from an initial position 411a to an end position 411d on the touch screen) may refer to a first touch gesture detected in a swipe area d3. The swipe area d3 may also be referred to as a swipe up recognition area. Further, the continuous movement of the first touch 411 (for example, the movement from the initial position 411a to the end position 411d on the touch screen) may refer to a first touch gesture detected from the bezel touch area d2 to the swipe area d3.

The continuous movement of the first touch 411 (for example, the movement from the initial position 411a to the end position 411d on the touch screen) may refer to a first touch gesture detected from the bezel touch area d2 to the swipe area d3 in the upward direction (for example, in the +y-axis direction).

The continuous movement of the first touch 411 (for example, the movement from the initial position 411a to the end position 411d on the touch screen) may mean that the first touch 411 is continuously maintained from the bezel touch area d2 to the swipe area d3 in the upward direction (for example, in the +y-axis direction). The first touch 411 on the touch screen 190 may be released at the end position 411d of the continuous movement.

In an embodiment of the present disclosure, a continuous movement of a touch includes a plurality of touches. The four touch positions 411a, 411b, 411c, and 411d illustrated above are one embodiment, and the number of touches in a continuous movement of a touch is not limited thereto. It would be easily understood by a person skilled in the art that the number of touches included in a continuous movement of a touch may vary (for example, corresponding to the resolution of the touch screen 190).

Referring to FIGS. 4C to 4F, the continuous movement of the first touch 411 from the bezel touch area d2 to the swipe area d3 in the upward direction (for example, in the +y-axis direction) may include a drag, a drag and drop, a flick, or a swipe.

The continuous movement of the first touch 411 (for example, the movement from the initial position 411a to the end position 411d on the touch screen) may be a straight line or a curve. For example, when the portable apparatus 100 is held with either of the right and left hands, the continuous movement of the first touch 411 with a thumb (for example, the movement from the initial position 411a to the end position 411d on the touch screen) may be a straight line or a curve.

When the continuous movement of the first touch 411 passes through the swipe area d3, a mobile card 191a may gradually emerge from a bottom edge of the touch screen 190 (for example, in the bezel touch area d2). The mobile card 191a may gradually be displayed (for example, frame in or fade in) from the bottom edge of the touch screen 190 (for example, in the bezel touch area d2) corresponding to the continuous movement of the first touch 411 passing through the swipe area d3.

When the continuous movement of the first touch 411 passes through the swipe area d3, the controller 110 may change the displayed first screen 400 to a different screen (for example, a white background screen, a black background screen, or a grey background screen). Further, when the continuous movement of the first touch 411 passes through the swipe area d3, the controller 100 may change the displayed first screen 400 to a different screen (for example, a single-color background screen or a multi-color background screen).

The controller 110 may provide the user with a feedback corresponding to the continuous movement of the first touch 411 passing through the swipe area d3.

The controller 110 may provide one of a visual feedback, an audio feedback, and a haptic feedback. Further, the controller 110 may provide the user with a combination of the visual feedback, the audio feedback, and the haptic feedback.

The visual feedback may include a visual effect (for example, a separate image or an animation effect, such as fading, applied to a separate image, not shown) corresponding to the continuous movement of the first touch 411 passing through the swipe area d3. The controller 110 may display the visual feedback on the touch screen 190.

The audio feedback may include a sound corresponding to the continuous movement of the first touch 411 passing through the swipe area d3. The controller 110 may output the audio feedback through the speaker 163. The controller 100 may output the audio feedback through one speaker or a plurality of speakers.

The haptic feedback may include vibrations corresponding to the continuous movement of the first touch 411 passing through the swipe area d3. The controller 110 may output the haptic feedback through the vibration motor 164. When there is a plurality of vibration motors 164, the controller 110 may output the haptic feedback selectively through one of the vibration motors.

A feedback providing time (for example, 500 ms) provided for the user may be changed through environment setup (not shown). At least one of a plurality of feedbacks (for example, visual, audio, and haptic feedbacks) provided corresponding to the continuous movement of the first touch 411 passing through the swipe area d3 may be selected.

Referring to FIGS. 4E and 4F, mobile cards 191a to 191c may gradually be displayed until the continuous movement of the first touch 411 reaches the end position 411d. The mobile cards 191a to 191c may move in the upward direction at a constant velocity corresponding to the continuous movement of the first touch 411. Further, the mobile cards 191a to 191c may move in the upward direction at the constant velocity until the continuous movement of the first touch 411 reaches the end position 411d.

The number of mobile cards 191a to 191c gradually displayed is three in one embodiment and may be changed according to a user setting (for example, card registration). The mobile cards 191a to 191c previously registered in the portable apparatus 100 may be displayed to overlap. For example, when the user registers ten mobile cards, the ten mobile cards may be displayed to overlap.

The mobile card 191a displayed on top may be a default mobile card.

In operation S306 of FIG. 3A, a mobile payment screen is displayed.

Figure 4G:
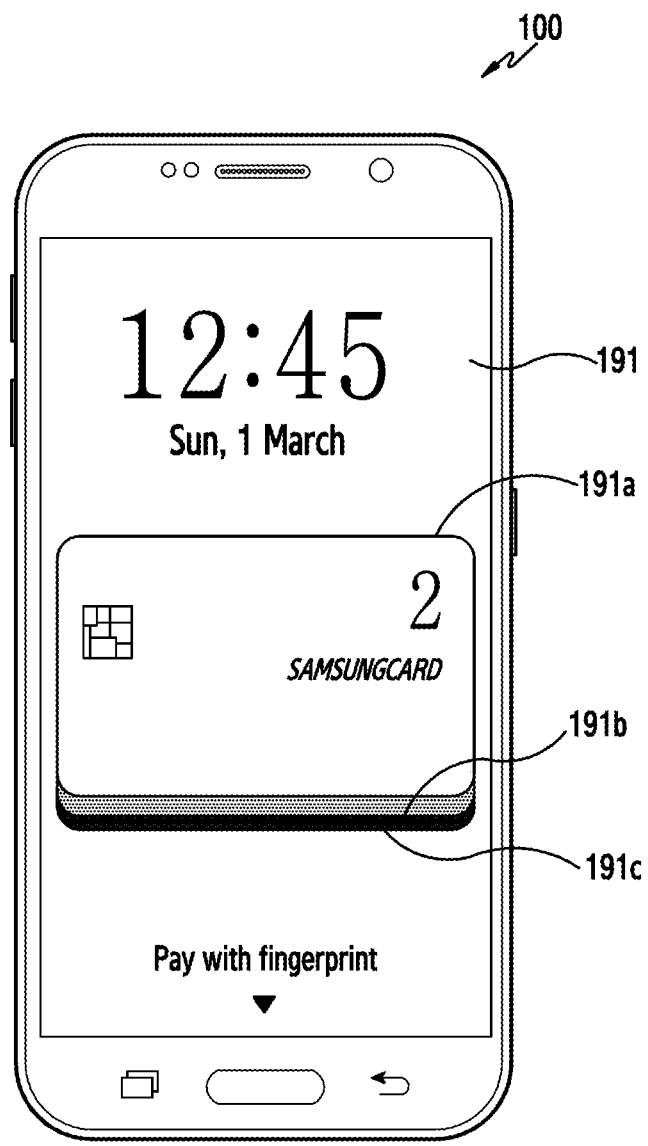

Referring to FIG. 4G, when the first touch 411 is released at the end position 411d, the controller 110 may display the mobile payment screen 191. When the first touch 411 is released at the end position 411d, the controller 110 may align the mobile cards 191a to 191c in a central area of the mobile payment screen 191. The controller 110 may bring the mobile cards 191a to 191c into top alignment, bottom alignment, or random alignment. In the various embodiments of the present disclosure, the terms "mobile payment screen" and "screen corresponding to mobile payment" may be used to refer to the same meaning.

The user may select another mobile card 191b, instead of the default mobile card 191a. For example, when the user touches (not shown) the default mobile card 191a and swipes (or drag, flick, or the like) across a lateral side (for example, in the +/−x-axis direction) of the touch screen 190, a second mobile card 191b positioned below the default mobile card 191a may be displayed. The default mobile card 191a may be positioned below a third mobile card 191c, which has been on the bottom.

Further, when the user touches (not shown) the third mobile card 191c positioned below the default mobile card 191a, the positions of the default mobile card 191a and the third mobile card 191c may be changed with each other.

It would be easily understood by a person skilled in the art that a mobile card other than the default mobile card 191a may be selected (or displayed) not only by the foregoing method including a swipe and/or touch but also by various methods (for example, shaking the portable apparatus 100).

In another embodiment of the present disclosure, a mobile card (one of 191a to 191c) may be selected before the first input 410 and the first touch 411. The user may select a mobile card (for example, 191b, one of 191a to 191c) first through a mobile payment application. The user selects the mobile card 191b and inputs a first input and a continuous movement of a first touch. The controller 110 may detect the selection of the mobile card 191b, and the first input and the continuous movement of the first touch 411 using the home button 161a, the touch screen 190, and the touch screen controller 195.

When the user releases the first touch 411 at the end position 411d, the controller 110 may display the mobile payment screen 191. When the mobile payment screen 191 is displayed, the user may bring the previously selected mobile card 191b into contact or non-contact with the POS device 200 (see FIG. 1) to implement mobile payment.

When the mobile payment screen 191 is displayed, the user may bring the top mobile card into contact or non-contact with the POS device 200 (see FIG. 1) to implement mobile payment. When the mobile payment screen 191 is displayed, the controller 110 may transmit payment information corresponding to the top mobile card to the POS device 200 (see FIG. 1) through a local area network according to a user input. When the mobile payment screen 191 is displayed and the mobile cards 191a to 191c are aligned, the user may bring the top mobile card into contact or non-contact with the POS device 200 (see FIG. 1) to implement mobile payment.

The controller 110 may provide the user with a feedback corresponding to display of the mobile payment screen 191.

The controller 110 may provide one of a visual feedback, an audio feedback, and a haptic feedback. Further, the controller 110 may provide the user with a combination of the visual feedback, the audio feedback, and the haptic feedback.

The feedback provided in operation S306 of FIG. 3A is substantially the same as the feedback provided in operation S305 of FIG. 3A (except for the different operation), and thus a repeated description is omitted herein.

In operation S306 of FIG. 3A, when the mobile payment screen 191 is displayed, the screen change method of the portable apparatus 100 ends.

According to another embodiment of the present disclosure, the fingerprint sensor 173 may not be installed in the home button 161a of the portable apparatus 100.

When the fingerprint sensor 173 is not installed in the home button 161a, operation S303 of FIG. 3A may be excluded from the screen change method of the portable apparatus 100.

When the fingerprint sensor 173 is installed in one of the recent app button 161b and the back button 161c and the user touches (or pushes) one of the recent app button 161b and the back button 161c, the controller 110 may detect a first input 410 from one of the recent app button 161b and the back button 161c (substantially the same as operation S302 of FIG. 3A).

When the user provides a first touch 411 in the bezel touch area d2, the controller 110 may detect the first touch 411 in the bezel touch area d2 using the touch screen 190 and the touch screen controller 195 (substantially the same as operation S304 of FIG. 3A).

When the user continuously moves the first touch 411 in the upward direction from the bezel touch area d2 of the touch screen 190, the controller 110 may detect the continuous movement of the first touch 411 using the touch screen 190 and the touch screen controller 195 (substantially the same as operation S305 of FIG. 3A).

When the user releases the first touch 411 at the end position 411d, the controller 110 may display the mobile payment screen 191. When the mobile payment screen 191 is displayed, the user may bring the top mobile card into contact or non-contact with the POS device 200 (see FIG. 1) to implement mobile payment.

Display of the mobile payment screen using a touch gesture (for example, a swipe) starting from the home button 161a may be achieved in the portable apparatus 100 having the fingerprint sensor 173 and in the portable apparatus 100 having no fingerprint sensor 173.

According to another embodiment of the present disclosure, the fingerprint sensor 173 may not be installed in the home button 161a of the portable apparatus 100. The touch screen 190 may recognize the user fingerprint. When the touch screen recognizes the user fingerprint, the touch screen 190 may be a fingerprint recognition-integrated touch screen (not shown).

The user fingerprint may be recognized through a set area (for example, a fingerprint recognition area of 30 mm×30 mm, the size of which varies depending on the size of the touch screen 190, not shown) of the fingerprint recognition-integrated touch screen (not shown). The set area (not shown) may be positioned above the home button 161a and may include part of the bezel touch area d2.

When the user fingerprint is recognized through the fingerprint recognition-integrated touch screen (not shown), operation S303 of FIG. 3A may be excluded from the screen change method of the portable apparatus 100.

When the user provides a first touch 411 through the fingerprint recognition area (not shown) including part of the bezel touch area d2, the controller 110 may detect the first touch 411 in the bezel touch area d2 using the touch screen 190 and the touch screen controller 195. The controller 110 may recognize the user fingerprint using the detected first touch 411.

When the user fingerprint is recognized and the user continuously moves the first touch 411 in the upward direction from the bezel touch area d2 of the touch screen 190, the controller 110 may detect the continuous movement of the first touch 411 using the touch screen 190 and the touch screen controller 195.

When the user releases the first touch 411 at the end position 411d, the controller 110 may display the mobile payment screen 191. When the mobile payment screen 191 is displayed, the user may bring the top mobile card into contact or non-contact with the POS device 200 (see FIG. 1) to implement mobile payment.

Display of the mobile payment screen using a touch gesture (for example, a swipe) starting from the home button 161a may be achieved in the portable apparatus 100 having the fingerprint sensor 173 and in the portable apparatus 100 having no fingerprint sensor 173.

When the mobile payment screen 191 is displayed, the screen change method of the portable apparatus 100 having no fingerprint sensor 173 installed in the home button 161a ends.

Figure 3B:
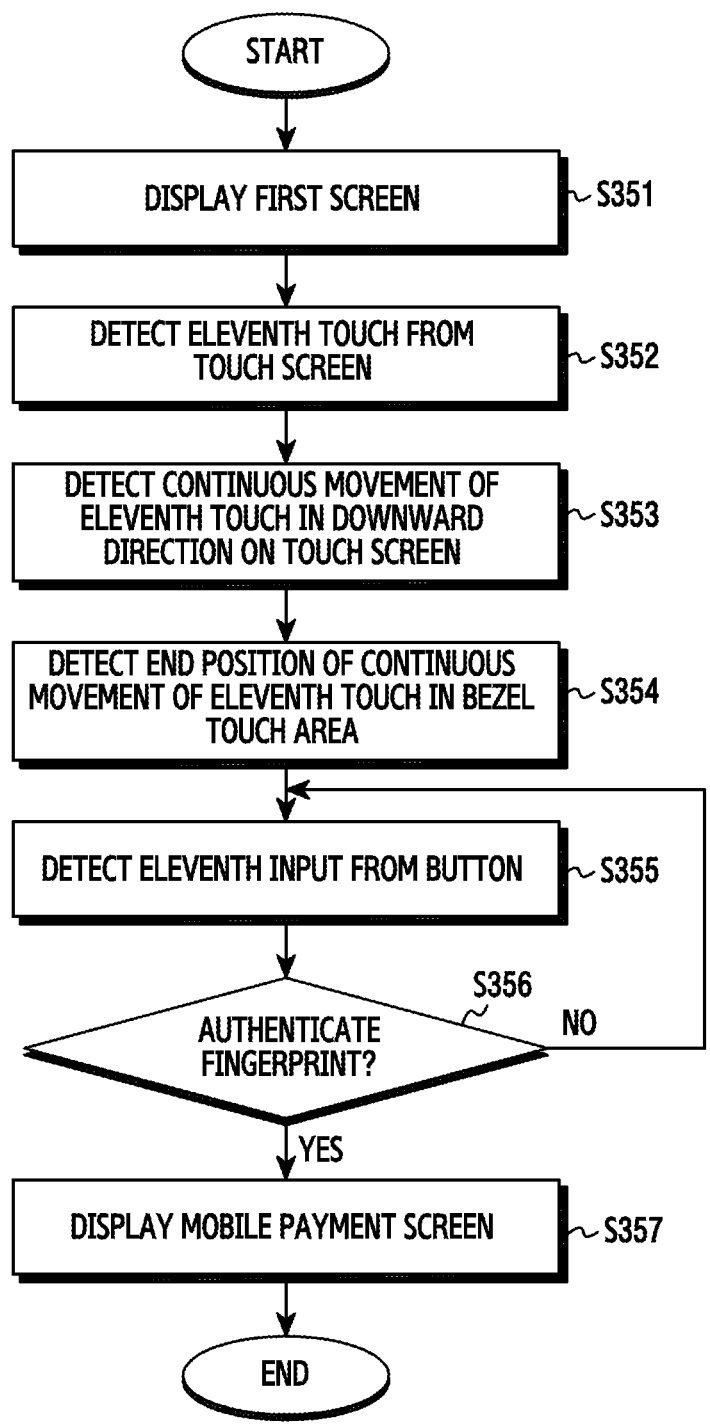
FIG. 3B is a schematic flowchart illustrating a screen change method of a portable apparatus according to an embodiment of the present disclosure.

FIG. 3B is a schematic flowchart illustrating a screen change method of a portable apparatus according to an embodiment of the present disclosure.

FIGS. 5A to 5H illustrate examples of a screen on a portable apparatus according to an embodiment of the present disclosure.

In operation S351 of FIG. 3B, a first screen is displayed on the touch screen.

Referring to FIG. 5A, a lock screen 400 as one first screen is displayed on the touch screen 190 according to control by the controller 110. The first screen may include not only the lock screen 400 but also a home screen (not shown), a screen of another running application (in-application screen, not shown), or a touch screen off screen (LDC off screen, not shown).

Display of the first screen in operation S351 of FIG. 3B is substantially the same as operation S301 of FIG. A (except for the different embodiment), and thus a repeated description is omitted herein.

In operation S352 of FIG. 3B, an eleventh touch is detected from the touch screen.

Referring to FIG. 5B, the user provides the eleventh touch 450 through the touch screen 190.

The controller 110 may detect the eleventh touch 450 using the touch screen 190 and the touch screen controller 195. The controller 110 may calculate an eleventh touch position 450a (for example, X11 and Y11 coordinates) corresponding to the eleventh touch 450 using an electrical signal received from the touch screen controller 195.

The controller 110 may store eleventh touch position information corresponding to the eleventh touch position 450a in the storage unit 175. The stored eleventh touch position information may include a touch ID, a touch position, a touch detection time, or touch information (for example, touch pressure, a touch direction, touch duration, or the like) for record management.

The controller 110 may detect the eleventh touch 450 in a lateral edge area of the touch screen 190. For example, the controller 110 may detect the eleventh touch 450 on one side (for example, one of the right and left sides) based on the center of the touch screen 190 (for example, an intersection point of two virtual lines each connecting two facing corners of the four corners of the touch screen 190).

The controller 110 may detect the eleventh touch 450 outside a swipe area d11 (see FIG. 5E) of the touch screen 190. Further, the controller 110 may detect the eleventh touch 450 outside a swipe down recognition area d11 (see FIG. 5E) of the touch screen 190.

The eleventh touch 450 detected from (for example, touching or hovering on) the touch screen 190 may be generated, for example, by a touch with one finger including a thumb or the touchable input pen 167.

In operation S353 of FIG. 3B, a continuous movement of the eleventh touch is detected from the touch screen.

Referring to FIGS. 5C to 5E, the controller 110 may detect (or calculate) the continuous movement of the eleventh touch 450 (for example, a plurality of X coordinates and Y coordinates corresponding to a continuous touch) detected from the touch screen 190 using the touch screen 190 and the touch screen controller 195. Position information corresponding to the continuous movement of the eleventh touch 450 may be stored in the storage unit 175 according to control by the controller 110.

In operation S354 of FIG. 3B, an end position of the continuous movement is detected. The continuous movement of the eleventh touch 450 (for example, a movement from an initial position 450a, through intermediate positions 450b and 450c, to an end position 450d) may refer to an eleventh touch gesture detected from the swipe area d11 to a bezel touch area d12. The swipe area d11 may also be referred to as a swipe down recognition area. Further, the continuous movement of the eleventh touch 450 (for example, the movement from the initial position 450a to the end position 450d) may refer to an eleventh touch gesture detected in up to the swipe area d11.

The continuous movement of the eleventh touch 450 may refer to an eleventh touch gesture detected from the swipe area d11 to the bezel touch area d12 in a downward direction (for example, in the −y-axis direction).

The continuous movement of the eleventh touch 450 may mean that the eleventh touch 450 is continuously maintained from the swipe area d11 to the bezel touch area d12 in the downward direction (for example, in the −y-axis direction). The eleventh touch 450 on the touch screen 190 may be released at the end position 450d of the continuous movement. When the continuous movement of the eleventh touch 450 passes through the end position 450d, the continuous movement of the eleventh touch 450 may pass out of the touch screen 190. The controller 110 may not detect the continuous movement of the eleventh touch 450 passing out of the touch screen 190.

Referring to FIG. 5E, the area of the swipe area d11 may be equal to, or larger than, the area of the swipe area d3 in FIG. 4D. Corresponding to detection of a swipe-down, the area of the swipe area d11 in FIG. 5E may be larger than the area of the swipe area d3 in FIG. 4D.

In an embodiment of the present disclosure, a continuous movement of a touch includes a plurality of touches. The four touch positions 450a to 450d illustrated above are one embodiment, and the number of touches in a continuous movement of a touch is not limited thereto. It would be easily understood by a person skilled in the art that the number of touches included in a continuous movement of a touch may vary (for example, corresponding to the resolution of the touch screen 190).

Referring to FIGS. 5C to 5E, the continuous movement of the eleventh touch 450 from the swipe area d11 to the bezel touch area d12 in the downward direction (for example, in the −y-axis direction) may include a drag, a drag and drop, a flick, or a swipe.

The continuous movement of the eleventh touch 450 may be a straight line or a curve. For example, when the portable apparatus 100 is held with either of the right and left hands, the continuous movement of the eleventh touch 450 with a thumb may be a straight line or a curve.

The continuous movement of the eleventh touch 450 may pass through the bezel touch area d12.

In operation S355 of FIG. 3B, an eleventh input is detected from the home button.

Referring to FIG. 5D, the user provides the eleventh input 451 through the home button 161a. The controller 110 may detect the eleventh input 451 using a push of the home button 161a or a touch of the home button 161a.

The controller 110 may store eleventh input information corresponding to the detected eleventh input 451 in the storage unit 175. The stored eleventh input information may include a touch ID, a touch position, a touch detection time, or the like for record management.

The eleventh input 451 detected from the home button 161a may be included in the continuous movement of the eleventh touch 450 (for example, a swipe as one touch gesture) detected in the bezel touch area d12. Alternatively, the eleventh input 451, which is separate from the eleventh touch 450 that is released in the bezel touch area d12, may be touched on the home button 161a.

The vertical length of the bezel touch area d12 (for example, in the +y-axis direction based on an edge of the touch screen 190) may be 3% (for example, 77 pixels) or less of the resolution of the touch screen 190 (for example, 2560×1440 pixels). Alternatively, the vertical length of the bezel touch area d12 may be 5% (for example, 128 pixels) or less of the resolution of the touch screen 190.

The vertical length of the bezel touch area d12 (for example, in the +y-axis direction based on the edge of the touch screen 190) may be shorter than the vertical length of a fingerprint recognition area d13 (for example, in the +y-axis direction based on the bottom of the fingerprint recognition area d13). For example, the vertical length of the bezel touch area d12 may be 50% or less of the vertical length of the fingerprint recognition area d13.

Detection of the eleventh input 451 from the home button 161a may be calculated using a final-position detection time of the eleventh touch 450 in the bezel touch area d12.

The controller 110 may detect the eleventh input 451 from the home button 161a using a difference (for example, an eleventh time interval T11, 1 sec or less) between the final-position detection time t10 of the eleventh touch 450 in the bezel touch area d12 and a detection time t11 of the eleventh input 451 through the home button 161a.

The eleventh input 451 may be detected from the home button 161a within the eleventh time interval T11. Further, the eleventh input 451 may be detected in the fingerprint recognition area d13 within the eleventh time interval T11. It would be easily understood by a person skilled in the art that the eleventh time interval T11 may be changed.

Detection of the eleventh input 451 from the home button 161a in operation S355 of FIG. 3B is substantially the same as operation S302 of FIG. 3A (except for the different embodiment), and thus a repeated description is omitted herein.

In operation S356 of FIG. 3B, a user fingerprint is authenticated.

Referring to FIGS. 5D and 5E, the controller 110 may receive fingerprint information corresponding to the user fingerprint using the fingerprint sensor 173 installed in the home button 161a. The controller 110 may receive the fingerprint information corresponding to the user fingerprint through the fingerprint recognition area d13 of the fingerprint sensor 173. The fingerprint recognition area d13 may be changed corresponding to the size and/or shape of the home button 161a with the fingerprint sensor 173. Further, the fingerprint recognition area d13 may be changed corresponding to the size and/or resolution of the fingerprint sensor 173 installed in the home button 161a.

The controller 110 may extract a fingerprint characteristic corresponding to the user from the received fingerprint information. The controller 110 may compare the extracted fingerprint characteristic with user fingerprint information (for example, including a fingerprint characteristic) previously registered in a fingerprint database in the storage unit 175 to authenticate the user fingerprint. Alternatively, the controller 110 may compare the extracted fingerprint characteristic with user fingerprint information (for example, including a fingerprint characteristic) previously registered in an external server (not shown) using the communication unit to authenticate the user fingerprint.

Authentication of the user fingerprint in operation S356 of FIG. 3B is substantially the same as operation S303 of FIG. 3A (except for disposition of fingerprint authentication), and thus a repeated description is omitted herein.

When the user fingerprint is authenticated through the eleventh input 451, a mobile card 191a may gradually emerge from a bottom edge of the touch screen 190 (for example, in the bezel touch area d12). The mobile card 191a may gradually be displayed (for example, frame in) from the bottom edge of the touch screen 190 (for example, in the bezel touch area d12) corresponding to the user fingerprint through the eleventh input 451.

When the user fingerprint is authenticated, the controller 110 may change the displayed first screen 400 to a different screen (for example, a white background screen, a black background screen, or a grey background screen). Further, when a user fingerprint is authenticated, the controller 100 may change the displayed first screen 400 to a different screen (for example, a single-color background screen or a multi-color background screen).

The controller 110 may provide the user with a feedback corresponding to authentication of the user fingerprint.

The controller 110 may provide one of a visual feedback, an audio feedback, and a haptic feedback. Further, the controller 110 may provide the user with a combination of the visual feedback, the audio feedback, and the haptic feedback.

The feedback provided in operation S356 of FIG. 3B is substantially the same as the feedback provided in operation S305 of FIG. 3A (except for the different operation), and thus a repeated description is omitted herein.

Figure 5G:
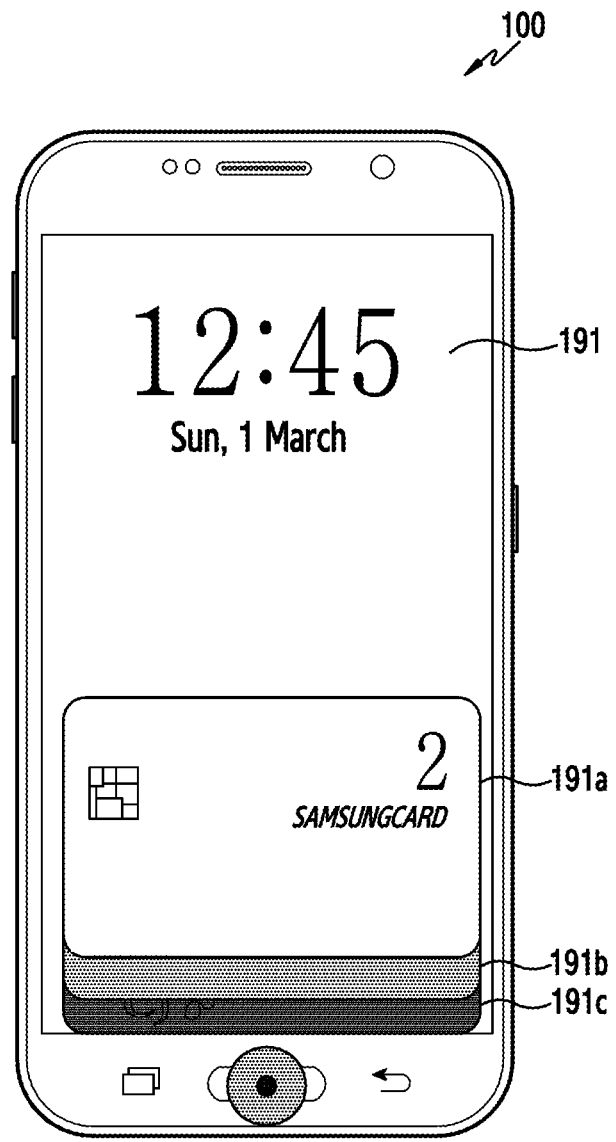

Referring to FIGS. 5F and 5G, mobile cards 191a to 191c may gradually be displayed until authentication of the user fingerprint is finished. The mobile cards 191a to 191c may move in the upward direction at a constant velocity corresponding to authentication of the user fingerprint. Further, the mobile cards 191a to 191c may move in the upward direction at the constant velocity for a set time (for example, 2 sec, which is variable) after authentication of the user fingerprint is finished.

The number of mobile cards 191a to 191c gradually displayed is three in one embodiment and may be changed according to a user setting (for example, card registration). The mobile cards 191a to 191c previously registered in the portable apparatus 100 may be displayed to overlap. For example, when the user registers ten mobile cards, the ten mobile cards may be displayed to overlap. The mobile card 191a displayed on top may be a default mobile card.

When the user fingerprint is not authenticated in operation S356 of FIG. 3B, operation S355 is repeated.

When the user fingerprint is authenticated in operation S356 of FIG. 3B, operation S357 is performed.

In operation S357 of FIG. 3B, a mobile payment screen is displayed.

Figure 5H:
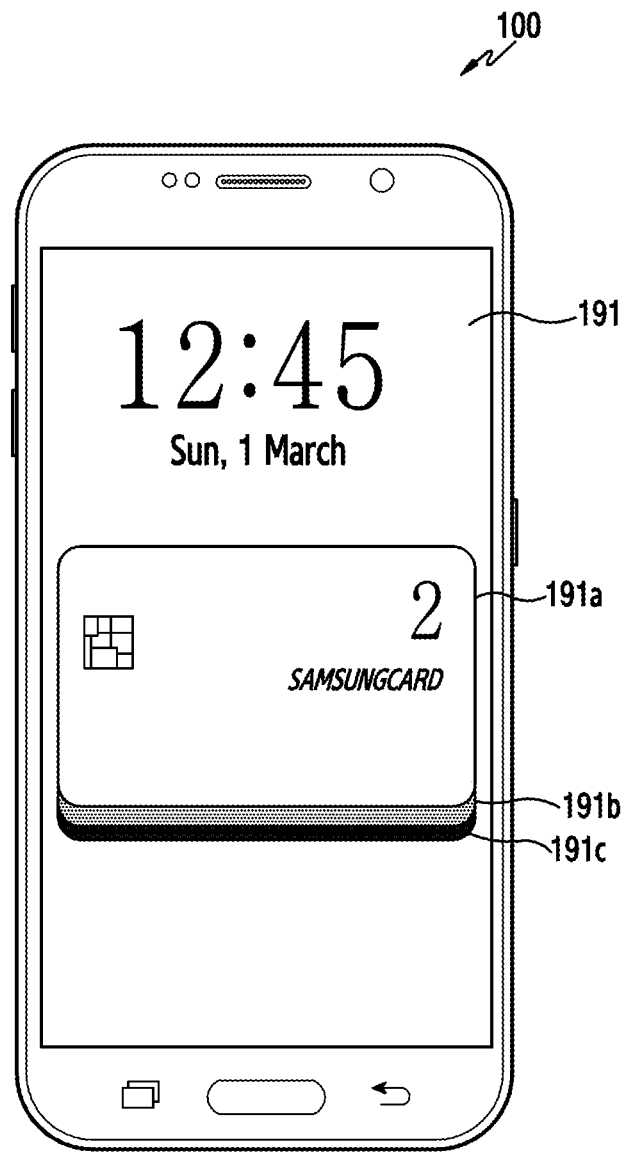

Referring to FIGS. 5G and 5H, when the user fingerprint is authenticated, the controller 110 may display the mobile payment screen 191. When the user fingerprint is authenticated, the controller 110 may align the mobile cards 191a to 191c in a central area of the mobile payment screen 191. The controller 110 may bring the mobile cards 191a to 191c into top alignment, bottom alignment, or random alignment.

The user may select another mobile card 191b, instead of the default mobile card 191a. For example, when the user touches (not shown) the default mobile card 191a and swipe (or drag, flick, or the like) across a lateral side (for example, in the +/−x-axis direction) of the touch screen 190, a second mobile card 191b positioned below the default mobile card 191a may be displayed. The default mobile card 191a may be positioned below a third mobile card 191c, which has been on the bottom.

The display of the mobile payment screen in operation S357 of FIG. 3B is substantially the same as the display of the mobile payment screen in operation S306 of FIG. 3A, and thus a repeated description is omitted herein.

The controller 110 may provide the user with a feedback corresponding to display of the mobile payment screen 191.

The controller 110 may provide one of a visual feedback, an audio feedback, and a haptic feedback. Further, the controller 110 may provide the user with a combination of the visual feedback, the audio feedback, and the haptic feedback.

The feedback provided in operation S357 of FIG. 3B is substantially the same as the feedback provided in operation S306 of FIG. 3A (except for the different operation), and thus a repeated description is omitted herein.

In operation S357 of FIG. 3B, when the mobile payment screen 191 is displayed, the screen change method of the portable apparatus 100 ends.

As described above, according to various embodiments, there may be provided a portable apparatus and a screen change method of the portable apparatus that display a mobile payment screen corresponding to a continuous movement of a touch, which starts from a button, reaching a touch screen. According to the present disclosure, there may be provided a portable apparatus and a screen change method of the portable apparatus that display a mobile payment screen corresponding to a continuous movement of a touch, which starts from a button having a fingerprint sensor to receive a user fingerprint, reaching a touch screen. According to the present disclosure, there may be provided a portable apparatus and a screen change method of the portable apparatus that display a mobile payment screen corresponding to a continuous movement of a touch, which starts from a button having a fingerprint sensor to receive a user fingerprint, passing through a swipe area of a touch screen.

According to the present disclosure, there may be provided a portable apparatus and a screen change method of the portable apparatus that display a mobile payment screen corresponding to a continuous movement of a touch, which starts from a touch screen, being detected from a button.

According to the present disclosure, there may be provided a portable apparatus and a screen change method of the portable apparatus that display a mobile payment screen corresponding to a continuous movement of a touch, which starts from a touch screen, being detected from a button having a fingerprint sensor to receive a user fingerprint.

According to the present disclosure, there may be provided a portable apparatus and a screen change method of the portable apparatus that display a mobile payment screen corresponding to a continuous movement of a touch, which starts from the outside of a swipe area of a touch screen, being detected from a button having a fingerprint sensor to receive a user fingerprint.

According to various embodiments of the present disclosure, without being limited to the above, there may be provided a portable apparatus and a screen change method of the portable apparatus that display a mobile payment screen corresponding to a continuous movement of a touch, which starts from a button having a fingerprint sensor, reaching a touch screen.

The methods according to the various embodiments of the present disclosure may be in a form of program commands executed through various computer means to be recorded in a computer readable medium. The computer readable medium may include a program command, a data file, a data structure, and the like independently or in combination. The computer readable medium may be stored, for example, in a volatile or non-volatile storage device such as a ROM, a memory such as a RAM, a memory chip, a memory device, or a memory IC, or a storage medium that is optically or magnetically recordable and simultaneously machine (for example, a computer)-readable, such as a compact-disc (CD), a digital versatile disc (DVD), a magnetic disk, or a magnetic tape, regardless of its ability to be erased or re-recorded.

It is appreciated that the storage unit included in the portable device is one example of the machine-readable storage media suitable for storing a program or programs including commands for implementing various embodiments of the present disclosure. The program command recorded in the medium may be things specially designed and configured for the present disclosure, or things that are well known to and can be used by those skilled in the computer software related art.

Although the present disclosure has been described by the restricted embodiments and the drawings as described above, the present disclosure is not limited to the aforementioned embodiments, and various modifications and alterations can be made from the descriptions by those skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A portable apparatus comprising:
a button configured to receive a first input;

a fingerprint sensor comprised in the button;
a touch screen, positioned above the button, configured to display a first screen and detect a second input continued to the first input; and
a controller configured to:
   control to authenticate a user using a user fingerprint received through the fingerprint sensor,
   control to identify the second input including a first touch at a position within a bezel touch area of the touch screen and a continuous movement toward a swipe area of the touch screen, wherein the first touch of the second input is initiated within a preset time interval from a time at which the first input is received,
   control to change the first screen to a mobile payment screen corresponding to the continuous movement of the second input initiated from the position within the bezel touch area, wherein the second input is detected on the touch screen,
   control to transmit, through a coil antenna to a point of sale device, a magnetic signal corresponding to payment information of a top mobile card among a plurality of mobile cards aligned in the mobile payment screen, and
   control to provide a feedback corresponding to the continuous movement of the second input,
wherein the feedback comprises at least one of an audio feedback, or a haptic feedback.

2. The portable apparatus of claim 1, wherein the button is configured as a physical button or touch button.

3. The portable apparatus of claim 1, wherein the controller is further configured to detect the first input and the second input as a single touch gesture.

4. The portable apparatus of claim 3, wherein the controller is further configured to detect the first input and the second input as the single touch gesture using one of a time interval between the first input and the second input and an area between the first input and the second input.

5. The portable apparatus of claim 1, wherein the controller is further configured to control to gradually display a payment mobile card from one side of the touch screen corresponding to authentication using the user fingerprint and the continuous movement of the second input.

6. The portable apparatus of claim 1,
wherein the touch screen comprises:
   a bezel touch area for receiving the second input, and
   a swipe area for receiving the continuous movement of the second input, and
wherein when the continuous movement of the second input passes through the swipe area, the controller is further configured to control to display a payment mobile card on the touch screen.

7. The portable apparatus of claim 1, wherein, when the second input is released at a final position of the continuous movement of the second input, the controller is further configured to control to display the mobile payment screen.

8. The portable apparatus of claim 1, wherein the controller is further configured to detect the continuous movement of the second input as one of a straight line or a curve.

9. The portable apparatus of claim 8, wherein the controller is further configured to control to gradually display a payment mobile card from one side of the touch screen corresponding to the continuous movement of the first input and authentication using the user fingerprint.

10. The portable apparatus of claim 1, wherein the controller is further configured to:
   control to change the first screen to a mobile payment screen corresponding to a continuous movement of a first input detected on the touch screen and the second input.

11. A screen change method of a portable apparatus, the screen change method comprising:
   detecting a first input through a button that comprises a finger print sensor receiving a user fingerprint;
   authenticating the user fingerprint using the first input;
   identifying a second input including a first touch at a position within a bezel touch area of a touch screen and a continuous movement toward a swipe area of the touch screen, wherein the first touch of the second input is initiated within a preset time interval from a time at which the first input is received;
   changing a first screen to a mobile payment screen corresponding to the continuous movement of the second input initiated from the position within the bezel touch area, wherein the second input; and
   transmitting, through a coil antenna to a point of sale (POS) device, a magnetic signal corresponding to payment information of a top mobile card among a plurality of mobile cards aligned in the mobile payment screen,
wherein the screen change method further comprises providing a feedback corresponding to the continuous movement of the second input, and
wherein the feedback comprises at least one of an audio feedback, or a haptic feedback.

12. The screen change method of claim 11, further comprising gradually displaying a mobile payment card from one side of the touch screen corresponding to authentication of the user fingerprint and the continuous movement of the second input.

13. The screen change method of claim 11, further comprising displaying the mobile payment screen comprising a mobile payment card corresponding to authentication of the user fingerprint and the continuous movement of the second input.

14. The screen change method of claim 11, wherein the first input and the second input are a single touch gesture.

* * * * *